(12) United States Patent
Shanbhogue et al.

(10) Patent No.: US 12,086,653 B2
(45) Date of Patent: Sep. 10, 2024

(54) SOFTWARE VISIBLE AND CONTROLLABLE LOCK-STEPPING WITH CONFIGURABLE LOGICAL PROCESSOR GRANULARITIES

(71) Applicant: Intel Corporation, Santa Clara, CA (US)

(72) Inventors: Vedvyas Shanbhogue, Austin, TX (US); Jeff A. Huxel, Austin, TX (US); Jeffrey G. Wiedemeier, Austin, TX (US); James D. Allen, Austin, TX (US); Arvind Raman, Austin, TX (US); Krishnakumar Ganapathy, Bee Cave, TX (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 17/134,065

(22) Filed: Dec. 24, 2020

(65) Prior Publication Data

US 2022/0206875 A1 Jun. 30, 2022

(51) Int. Cl.
*G06F 9/30* (2018.01)
*G06F 9/38* (2018.01)
*G06F 9/52* (2006.01)
*G06F 11/07* (2006.01)
(Continued)

(52) U.S. Cl.
CPC ............ *G06F 9/52* (2013.01); *G06F 9/30101* (2013.01); *G06F 9/3885* (2013.01); *G06F 11/0724* (2013.01); *G06F 11/0751* (2013.01); *G06F 11/0772* (2013.01); *G06F 11/1629* (2013.01);
(Continued)

(58) Field of Classification Search
CPC ...... G06F 9/52; G06F 9/30101; G06F 9/3885; G06F 11/0724; G06F 11/0751; G06F 11/0772; G06F 11/1629; G06F 11/1683; G06F 9/45558
See application file for complete search history.

(56) References Cited

U.S. PATENT DOCUMENTS 5,226,152 A 7/1993 Klug et al.
6,792,525 B2 * 9/2004 Mukherjee ............ G06F 9/3861
712/E9.05

(Continued)

OTHER PUBLICATIONS

Extended European Search Report for Patent Application No. 21198503.1, Mailed Feb. 25, 2022, 10 pages.
(Continued)

*Primary Examiner* — Corey S Faherty
(74) *Attorney, Agent, or Firm* — Compass IP Law PC

(57) ABSTRACT

A processor is described. The processor includes model specific register space that is visible to software above a BIOS level. The model specific register space is to specify a granularity of a processing entity of a lock-step group. The processor also includes logic circuitry to support dynamic entry/exit of the lock-step group's processing entities to/from lock-step mode including: i) termination of lock-step execution by the processing entities before the program code to be executed in lock-step is fully executed; and, ii) as part of the exit from the lock-step mode, restoration of a state of a shadow processing entity of the processing entities as the state existed before the shadow processing entity entered the lock-step mode and began lock-step execution of the program code.

24 Claims, 36 Drawing Sheets

(51) Int. Cl.
*G06F 11/16* (2006.01)
*G06F 9/455* (2018.01)

(52) U.S. Cl.
CPC ...... *G06F 11/1683* (2013.01); *G06F 9/45558* (2013.01)

(56) References Cited

U.S. PATENT DOCUMENTS

| | | | |
|---|---|---|---|
| 8,239,836 B1 * | 8/2012 | Franz | G06F 21/52 717/127 |
| 9,052,887 B2 * | 6/2015 | Rohleder | G06F 9/28 |
| 9,697,094 B2 * | 7/2017 | Das | G06F 3/0647 |
| 10,719,356 B1 * | 7/2020 | Corbett | G06F 9/5027 |
| 11,080,135 B2 * | 8/2021 | Chen | G06F 11/1048 |
| 2006/0107116 A1 | 5/2006 | Michaelis et al. | |
| 2006/0212677 A1 | 9/2006 | Fossum | |
| 2022/0206875 A1 | 6/2022 | Shanbhogue et al. | |

OTHER PUBLICATIONS

Doran, H.D. et al, "Dynamic Lockstep Processors for Applications with Functional Safety Relevance", 2021 IEEE 26th International Conference on Emerging Technologies and Factory Automation (ETFA), downloaded from https://www.researchgate.net/publication/356680030_Dynamic_Lockstep_Processors_for_Applications_with_Functional_Safety_Relevance, DOI: 10.1109/ETFA45728.2021.9613543, Sep. 2021, 4 pages.

* cited by examiner

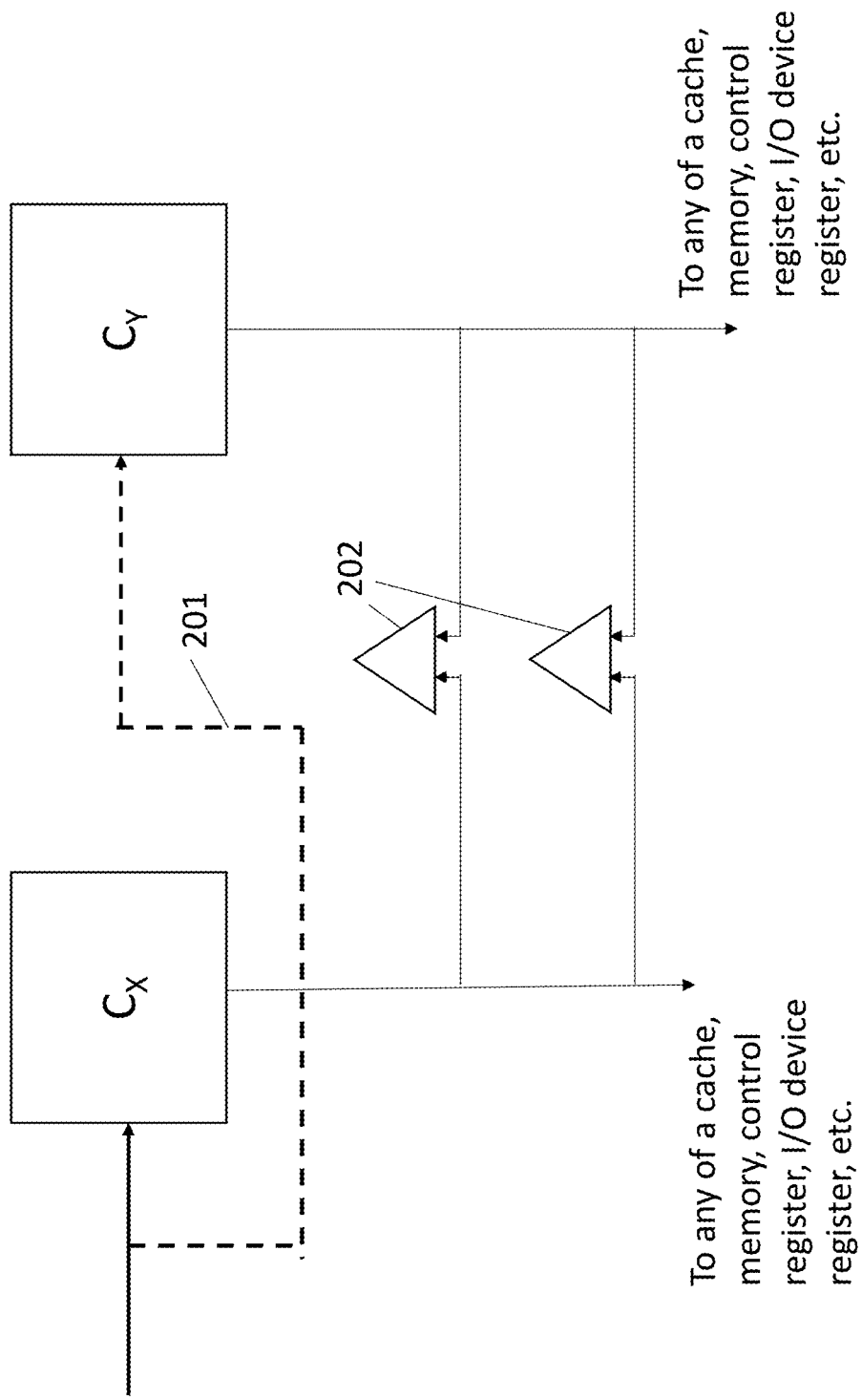

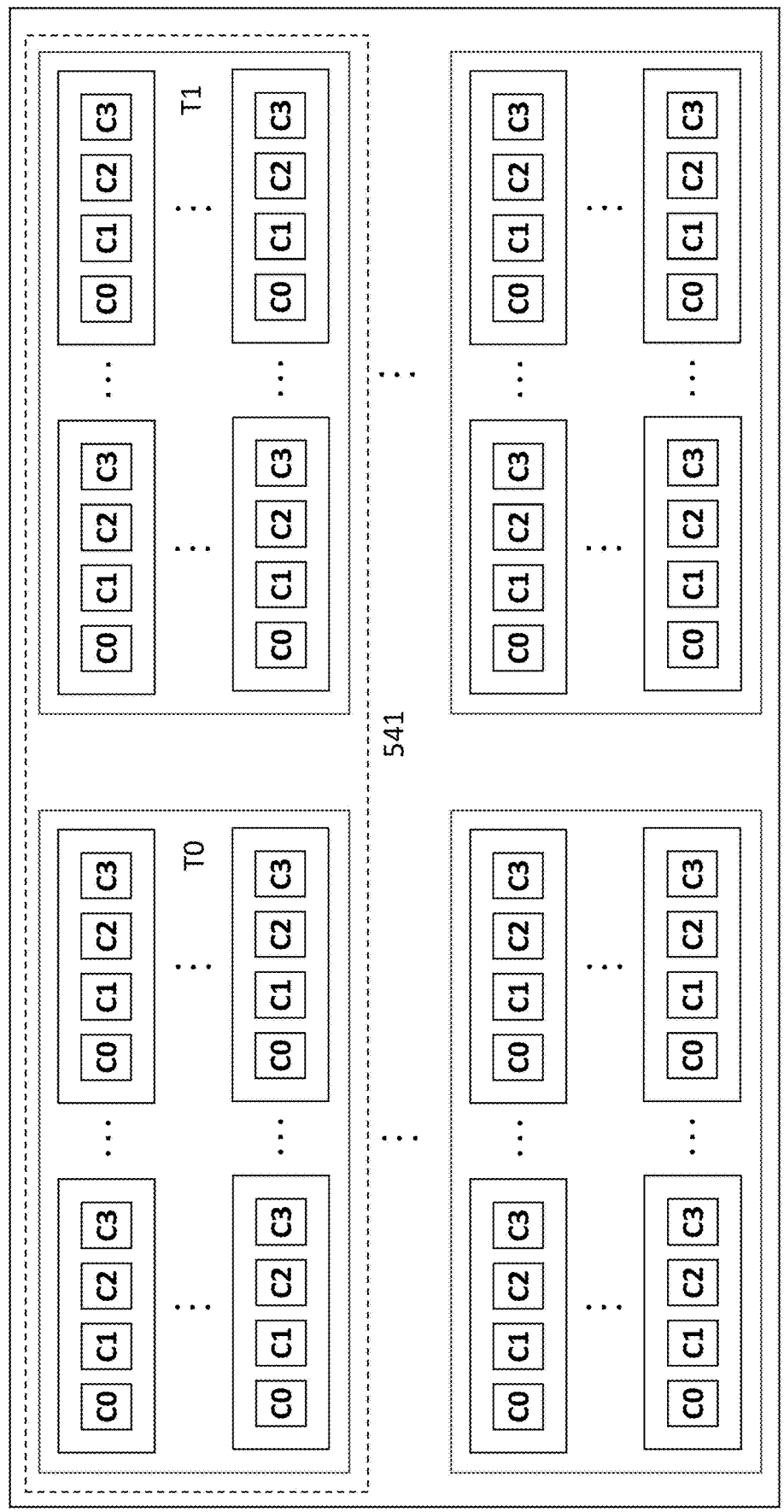

611

| Bits | Type | Name | Description |
|---|---|---|---|
| 7:0 | RO | DLSM_LEVEL_TYPE | The topology level at which lockstep supported: (granularity of processing entity) 0. Invalid 1. SMT 2. Core 3. Module 4. Tile 5. Die 6-255 Reserved |
| 8 | RO | CAN_BE_ACTIVE | 0: processing entity cannot be active; 1: processing entity can be active |
| 9 | RO | CAN_BE_SHADOW | 0: processing entity cannot be shadow; 1: processing entity can be shadow |
| 63:32 | RO | PEER_TOPOLOGY_ID | Permissible lock-step peer(s) for this processing entity |

LSGD 601
602
603
604

Fig. 6a

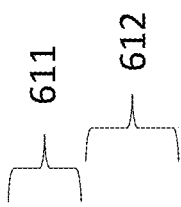
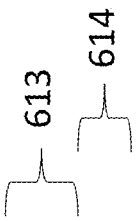
Fig. 6b
Fig. 6c

| Bit | Name | Description |
|---|---|---|
| 0 | SEVT | Shadow event caused break |
| 1 | SWI | SW initiated break |
| 2 | MISCO | Mis-Compare caused break |

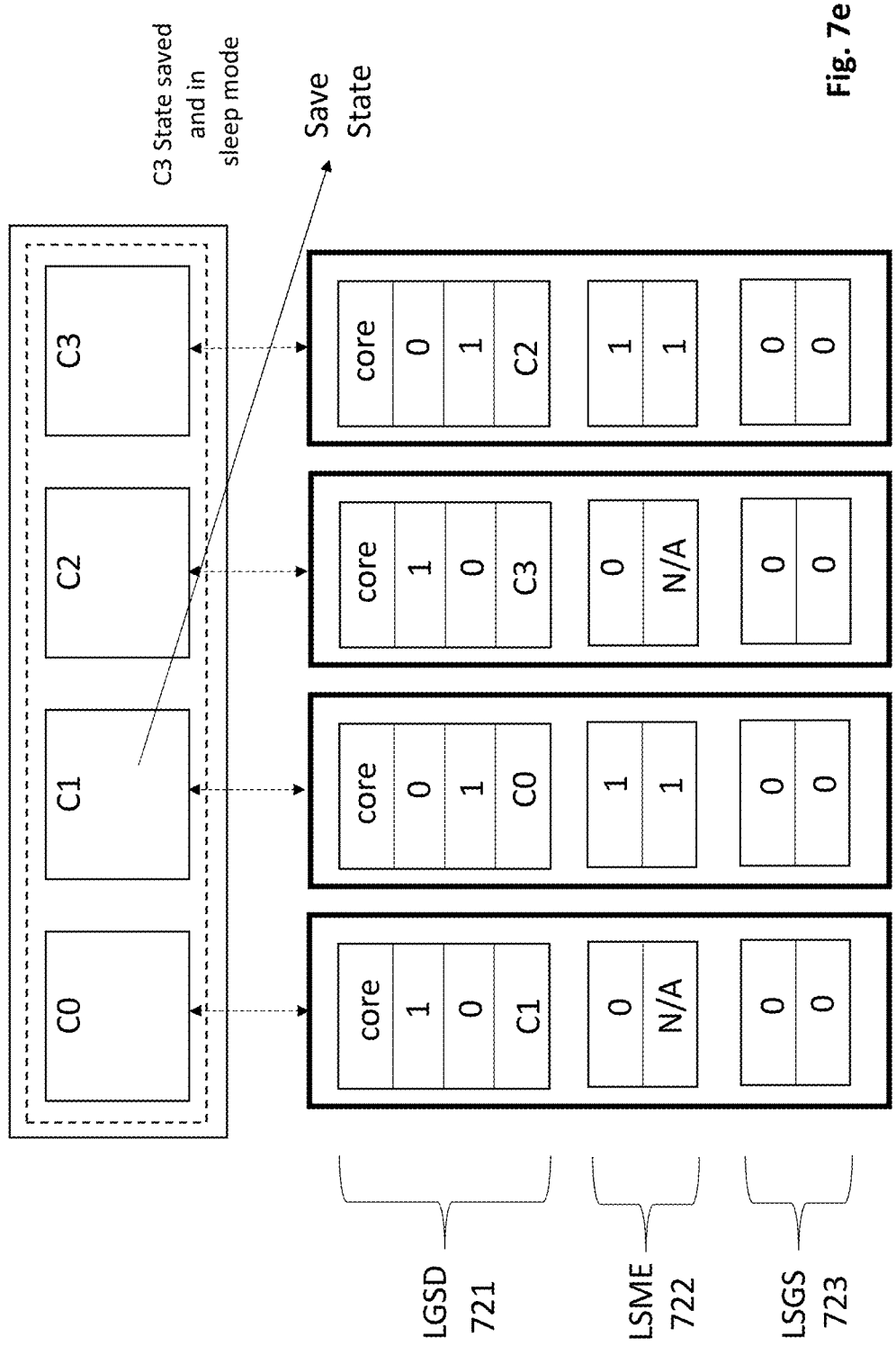

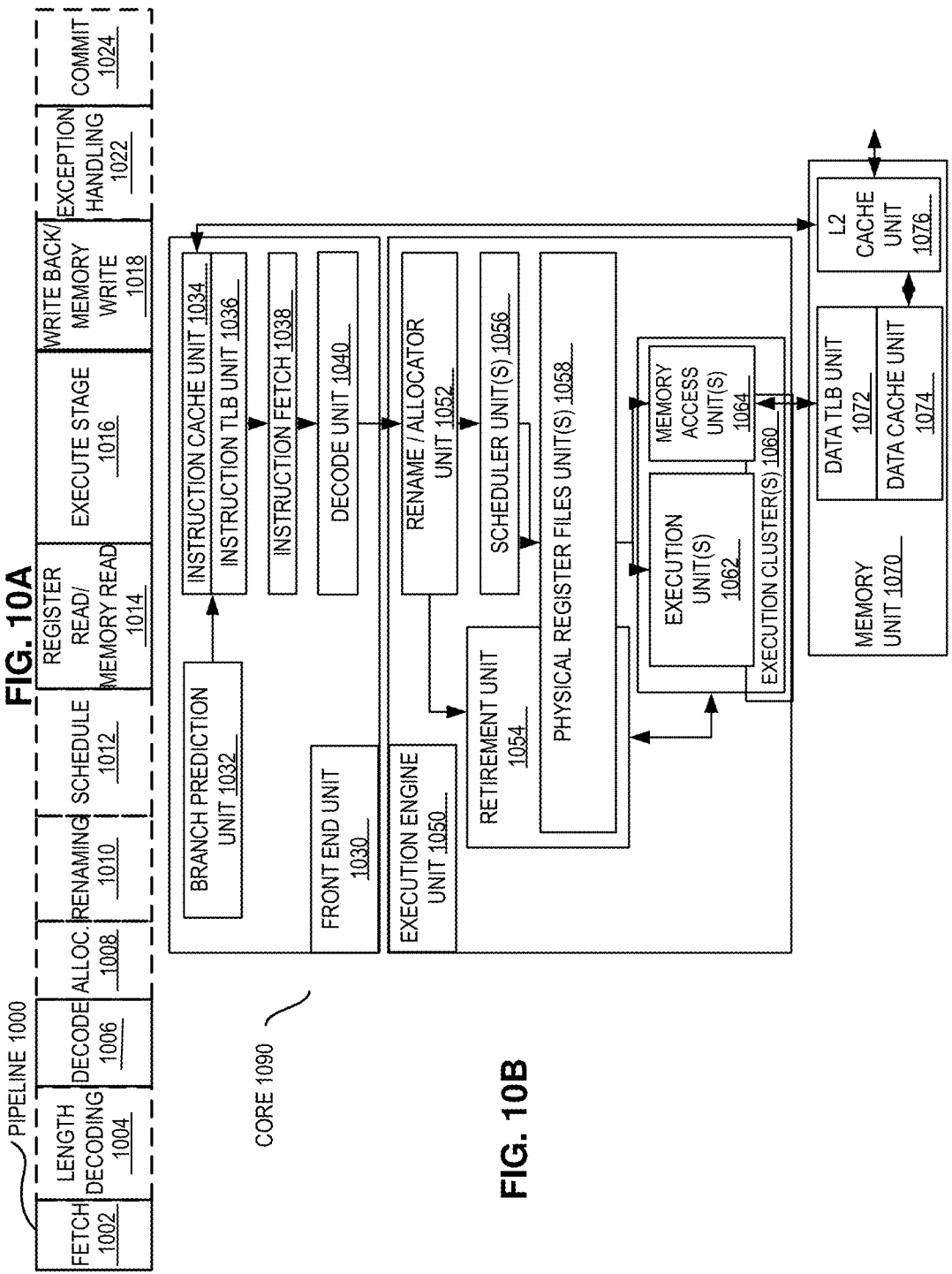

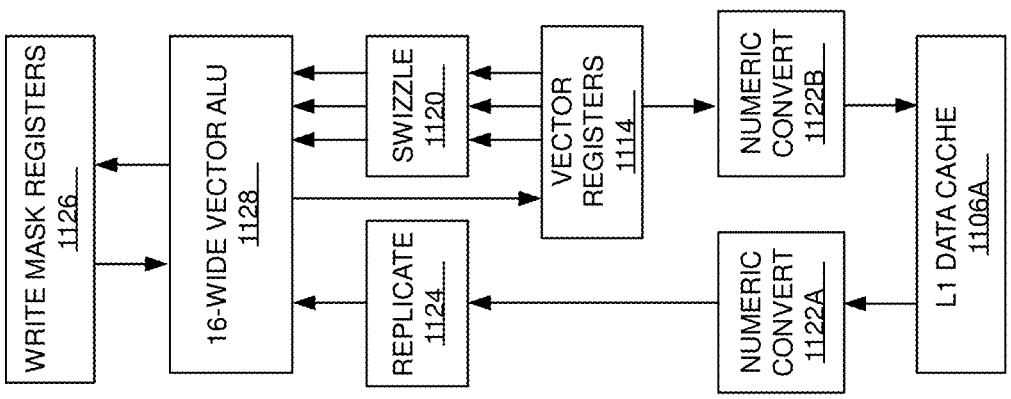
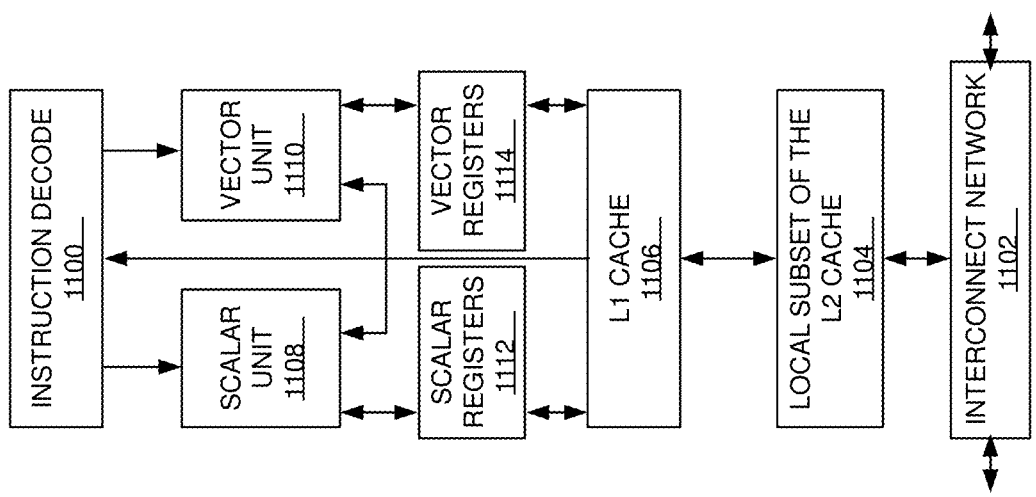

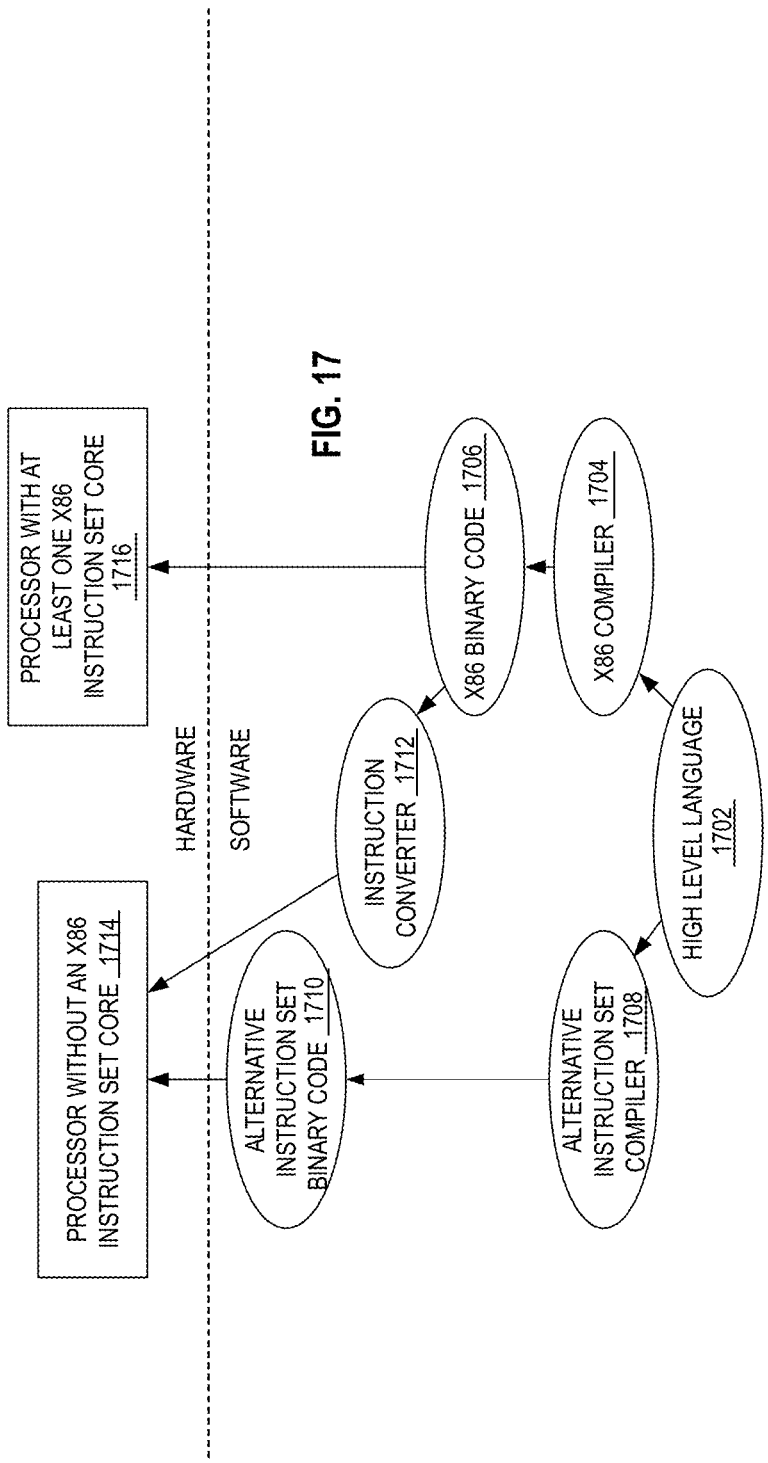

SOFTWARE VISIBLE AND CONTROLLABLE LOCK-STEPPING WITH CONFIGURABLE LOGICAL PROCESSOR GRANULARITIES

FIELD OF INVENTION

The field of invention pertains generally to the computing sciences, and, more specifically, to software visible and controllable lock-stepping with configurable logical processor granularities.

BACKGROUND

FIG. 1 shows a traditional multi-core processor 100 that supports "lock-step" execution of pairs of processing cores. As observed in FIG. 1, the prior art processor 100 includes multiple modules 101 of processing cores, where, each module includes four processing cores C0, C1, C2 and C3. The multi-core processor 100 is further arranged as multiple tiles 102 where each tile is composed of multiple modules.

Certain types of software operations are very sensitive to data corruptions (e.g., "bit-flips"). For example, in some cases, if a corruption occurs while data is being encrypted, the original data cannot be decrypted back to its exact original form.

Lock stepping is a hardware assisted approach for ensuring that a software process has been correctly executed without corruption. In the case of lock-stepping, at least two identical processing cores (e.g., C0/C1 or C2/C3) are loaded with a same initial state and begin execution of the same instruction sequence on the same data. Over the course of their execution, ideally, both processing cores will simultaneously generate the same intermediate values, many of which are ultimately written to any of a cache, memory, control register, I/O device register, etc.

As observed in FIG. 2, the module that the cores belong to includes special hardware 201 to broadcast the input to one core $C_X$ to the other core $C_Y$ so they can operate the same code from the same state. The module also includes a pair of comparators 202 to compare the intermediate values. That is, an intermediate value produced by one of the cores $C_X$ is twice compared with the corresponding intermediate value that was simultaneously produced by the other of the cores $C_Y$ (the pair of comparators provides redundancy of the comparison operation). If the comparators yield different comparison results, one of the comparators is not working correctly, and/or, the intermediate values were different.

The cores $C_X$, $C_Y$ continue to execute the instruction sequence with the comparators 202 comparing the intermediate values that are generated along the way. After execution of the instruction sequence is complete, the pair of executions either deviated from one another or they did not deviate from one another. In the case of the former (the pair of executions deviated), either the comparators 202 yielded different comparison results for at least one intermediate value, and/or, the final resultants generated by the cores $C_X$, $C_Y$ at completion are different. In the case of the latter (the pair of executions did not deviate), the comparators 202 never yielded different comparison results and the final resultants generated by the cores $C_X$, $C_Y$ at completion are the same.

Referring back to FIG. 1, each module 101 is designed so that only C0 and C1 can be a lock-step pair and only C2 and C3 can be a lock-step pair. The C0/C1 pair therefore have associated model specific register (MSR) space (not shown in FIG. 1 for illustrative ease) that specifies whether C0/C1 have been lock step mode enabled or not ("machine specific register" can also be used to refer to the acronym "MSR"). Likewise, the C2/C3 pair also have associated MSR space that specifies whether C2/C3 have been lock step mode enabled or not. Thus, the lock-step configuration of a module 101 can be one of four possible states: 1) no cores are lock-step enabled; 2) only C0/C1 are lock-step enabled; 3) only C2/C3 are lock-step enabled; 4) C0/C1 are lock step enabled and C2/C3 are lock-step enabled.

According to the design of the processor 100 of FIG. 1, if any pair of cores are to be placed in lock step, lowest-level firmware/software (Basic Input Output Software (BIOS)) manipulates the aforementioned MSR space of the module 101 to enable lock-step mode for the desired pair(s) of cores. In response to the write to the MSR space, the cores that are newly lock-step enabled have their state saved and are placed into a sleep state. After being put to sleep, both cores are configured to execute the corruption sensitive instruction sequence (each core is setup with identical instructions and data). The cores are then woken up and they begin lock-step execution.

A problem with the processor of FIG. 1 is that lock-stepping activity is controlled by the BIOS which gives higher levels of software (e.g., virtual machine monitors (VMMs), operating system (OS) instances, applications, etc.) little/no visibility into the lock-step activity. Here, during lock-step, one of the cores is deemed the active core while the other of the cores is deemed a "shadow" core. The active core, for instance, is the core that is executing the thread that has the corruption sensitive instruction sequence. The shadow core, by contrast, is a core that needs to be specially re-purposed to essentially double check execution of the active core's thread.

As such, when lock-step mode is enabled, the threads that were executing on the shadow core suddenly have their core "disappear" (the shadow core is permanently placed in lock-step so that it cannot be used, other than for lock-stepping). Such drastic changes in the apparent configuration of the underlying hardware can, in at least come cases, detrimentally affect the software (e.g., the pool of cores to which threads can be dispatched suddenly loses a core). Moreover, with lock-stepping being controlled at the BIOS level, entering lock-step was more akin to a time consuming hardware reset.

Further still, again because lock-stepping was controlled at the BIOS level, once a core was placed in lock-step mode it could not be exited from. Here, BIOS is a piece of software/firmware that runs at the start time of a computer that is being powered on and does not run afterwards. As such, in BIOS initiated lockstep, cores are placed into lockstep early on at the time of BIOS execution and remain in lock-step thereafter (after being placed into lock-step BIOS ceases execution and is not available thereafter to remove the cores from lock-step).

BRIEF DESCRIPTION OF THE DRAWINGS

The present invention is illustrated by way of example and not limitation in the figures of the accompanying drawings, in which like references indicate similar elements and in which:

FIG. 2 shows processing cores and supporting hardware for lock-step execution;

FIG. 3b shows a method that can be performed by the improved multiprocessor of FIG. 3a;

FIGS. 5a, 5b, 5c, 5d and 5e show lock-step groups having different logical processor granularities;

FIGS. 6a, 6b, 6c and 6d show model specific register space that is visible to and write-able by software;

FIGS. 7a, 7b, 7c, 7d, 7e, 7f, 7g, 7h and 7i depict a process of entering lock-step mode;

FIG. 10A is a block diagram illustrating both an exemplary in-order pipeline and an exemplary register renaming, out-of-order issue/execution pipeline according to some embodiments;

FIG. 10B is a block diagram illustrating both an exemplary embodiment of an in-order architecture core and an exemplary register renaming, out-of-order issue/execution architecture core to be included in a processor according to some embodiments;

FIGS. 11A-B illustrate a block diagram of a more specific exemplary in-order core architecture, which core would be one of several logic blocks (including other cores of the same type and/or different types) in a chip;

FIG. 11A is a block diagram of a single processor core, along with its connection to the on-die interconnect network and with its local subset of the Level 2 (L2) cache, according to some embodiments;

FIG. 11B is an expanded view of part of the processor core in FIG. 11A according to some embodiments;

FIG. 14 is a block diagram of a first more specific exemplary system in accordance with some embodiment;

FIG. 15 is a block diagram of a second more specific exemplary system in accordance with some embodiments;

FIG. 16 is a block diagram of a System-on-a-Chip (SoC) in accordance with some embodiments;

FIG. 17 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1:
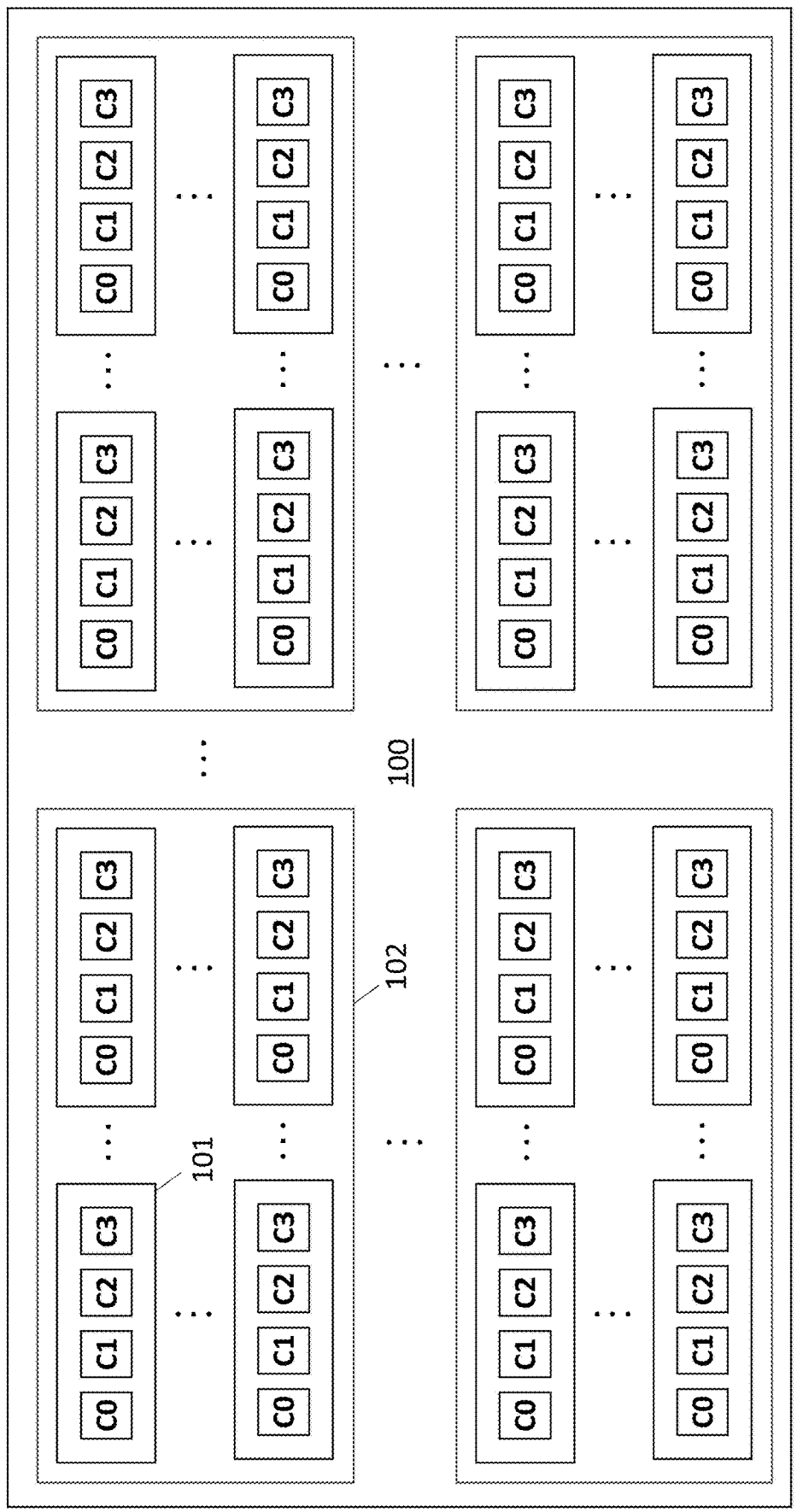
FIG. 1 shows a multiprocessor that can perform lock-step execution (prior art)

An improved approach therefore strives to make the lock-step activity more visible to software that resides above the BIOS level and executes beyond a computer's early on time. Here, software is commonly viewed as a "stack" of different functional levels. At a highest level is application software that instructs a computer to perform particular/customized tasks that an end user desires the computer to perform. Beneath the application software is an operating system that the application software invokes to use the computer's hardware resources (e.g., non volatile mass storage, main memory, CPU resources, network interface(s), etc.). In, e.g., higher performance environments (e.g., datacenters), multiple operating system instances are configured to operate on a VMM or hypervisor. Beneath the VMM/hypervisor in the stack hierarchy is BIOS and firmware. BIOS, as explained above, is firmware/software that executes early on during a computer's boot-up/bring-up. Firmware is program code that controls a specific hardware component.

Moreover, a computer platform typically has different "privilege levels". A software program, task or thread that is written to access or control a sensitive hardware component (e.g., sensitive register space, sensitive regions of main memory, etc.) is supposed to be assigned a higher privilege level, while, programs/tasks/threads that do not seek access or control of a sensitive hardware component are assigned a lower privilege level. BIOS, being software/firmware that executes closely with the hardware, is typically allocated higher/highest privilege levels. Also, certain threads/tasks of a VMM or operating system can be assigned higher/highest privilege levels. Common application software, however, is typically assigned a lower/lowest privilege level.

With BIOS being in control of lock-step activity and being assigned higher/highest privilege levels, in the prior art approach, lock-step activity was not visible to software having lesser privilege levels (e.g., application software and/or certain VMM/OS tasks/threads). Here, with the improved approach, as described in more detail below, model specific registers (MSRs) are used to control and/or provide visibility into the lock-step activity. As such, by associating the MSRs with a particular privilege level (including, if desired, lesser privilege levels) any software above/beyond BIOS can be configured to control/observe lock-step activity.

As such, to make the lock-step activity more visible to software that resides above the BIOS level (e.g., if desired, software programs/tasks/threads having less than a highest privilege level or lesser privilege level), in the improved approach, e.g., any of VMMs, hypervisors, OS instances, and/or application software, etc. are able to monitor and/or control lock-step execution (nevertheless, in various embodiments BIOS is also given the ability to observe and control lock-step activity). With software layers above BIOS having the ability to monitor and control lockstep, lockstep mode can be dynamically and repeatedly entered/exited during runtime at will (a processing entity is no longer permanently in lock-step after being placed in lock-step).

Figure 3A:
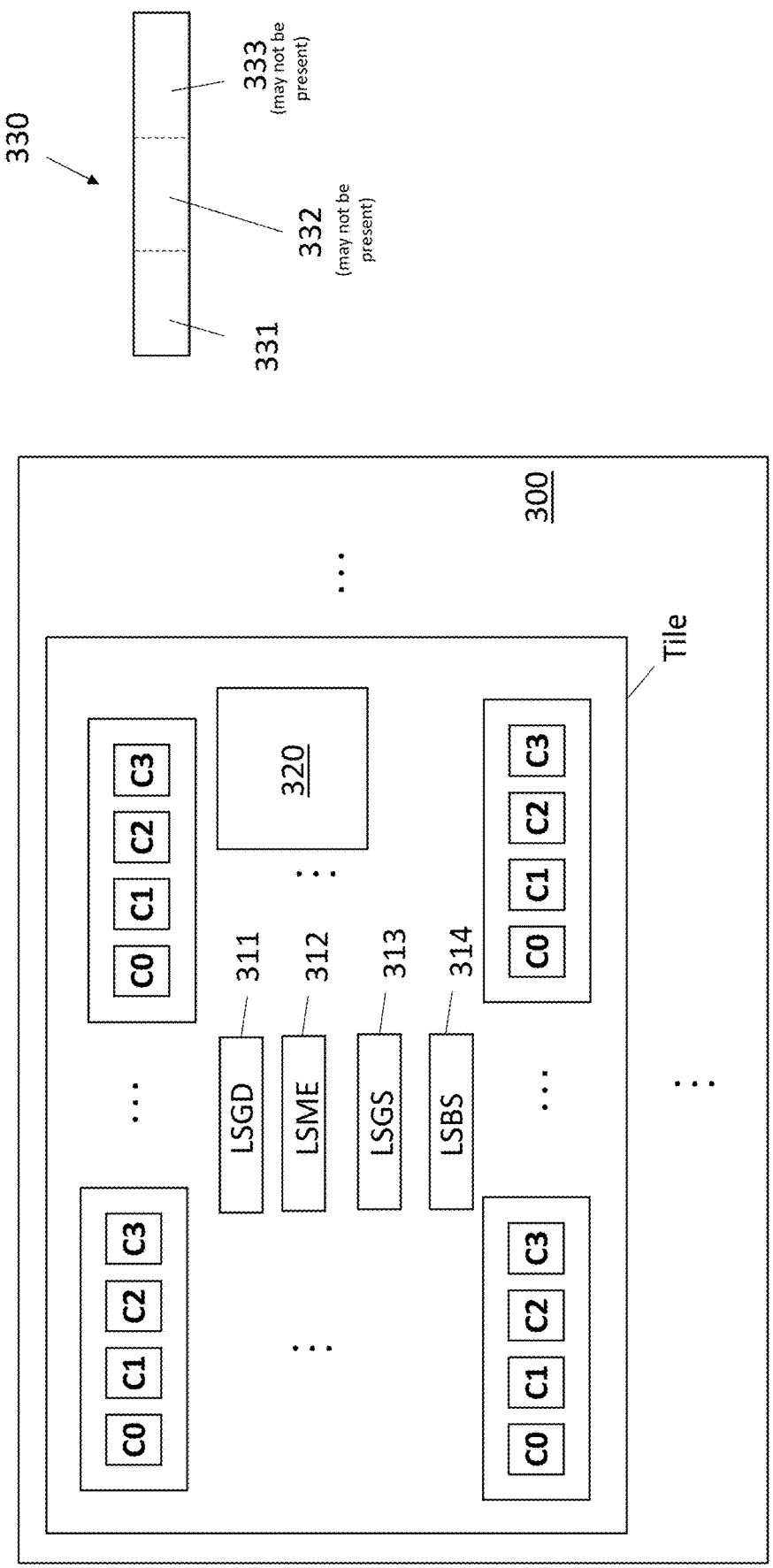
FIG. 3a show an improved multiprocessor that can perform lock-step execution.

FIG. 3a shows an improved multi-core processor 300 whose cores can be placed in lock-stop mode under higher level software control (e.g., VMM, OS instance, application) and/or lesser privilege level software control (e.g., application software, certain VMM/OS tasks/threads). Software is therefore less prone to being adversely affected by lock-step entry or exit, lock-step execution can be stopped before it has completed, and, the processing entities (e.g., cores) are not permanently placed in lock-step mode. Additionally, the delays associated with entry into and exit from lock-step mode are more consistent with power state changes having smaller delays as opposed to hardware resets having longer delays.

In particular, according to various embodiments, lock-step entry/exit is akin to C6 power state exit/entry in which a core enters/exits a deep sleep mode. C6 power state entry/entry is generally associated with a power state where a core's state is externally saved to put it to sleep and its clocks are removed to save power. Power management software of computing systems frequently invoke C6 entry/removal on a per core basis. Thus, implementing the state saving/re-loading activity of both the active and shadow cores for entry/exit to/from lock-step mode as akin to C6 entry/removal comfortably integrates lock-step hardware support into existing software platforms from both the perspective of functional cohesion (shadow cores do not disappear) and propagation delay (less time is consumed entering/exiting to/from lock-step mode).

Furthermore, as explained in more detail immediately below, the range of instruction execution resources that can be placed into lock-step mode in the improved multiprocessor of FIG. 3a is greatly expanded as compared to the multi-processor of FIG. 1. In particular, as explained in more detail below, individual instruction execution pipelines, cores, modules and tiles can all be placed into lock-step mode with a symmetrical peer. Further still, the improved processor 300 of FIG. 3a is able to break out of lock-step mode once lock-step mode has been entered.

Importantly, the improved processor of FIG. 3a includes enhanced MSR space 311, 312, 313, 314 that is visible to software and provides the software with sufficient information to control the lock step activity. For ease of illustration, FIG. 3a shows register space 311, 312, 313, 314 organized into four different MSR registers 311, 312, 313, 314. Other embodiments may exist where all of register space 311, 312, 313, 314 is organized, e.g., into a single register, less than four registers, etc (here, register "space" corresponds to a field within a register). For illustrative ease FIG. 3a also shows the register space 311, 312, 313 and 314 only for a single instruction execution pipeline. As is known in the art, an instruction execution pipeline is a fundamental hardware unit for the execution of an instruction sequence/thread.

In various embodiments, MSR registers are assigned different classes, where, a different class defines a different combination of software levels that are permitted to access an MSR having that class (e.g., class 1=BIOS, VMM and OS have permission to access; class 2=only BIOS has permission to access; class 3=only VMM and OS have permission to access; class 4=only system management mode (SMM) has permission to access). According to one implementation, the MSR registers 311, 312, 313 and 314 are class 1 MSR registers and are therefore made accessible to any of BIOS, VMM and OS software. In various other embodiments, other classes and/or access privileges can be assigned for the MSR registers 311, 312, 313, 314 (e.g., class 2, class 3, a class that only allows VMM access, a class that only allows an OS permission). In yet other embodiments, application software and/or certain tasks/threads of an application software program can be given a privilege level to access a class 1 FSM (e.g., if desired by a user and allowed by the underlying OS), or other high/higher privilege level.

In various embodiments, such register space 311, 312, 313, 314 exists for each instruction execution pipeline that can participate in lock-step execution. Importantly, each core includes multiple instruction execution pipelines (e.g., 8, 16, etc.). As such, according to various embodiments, one or more instruction execution pipelines per core are recognized as "processing entities" that are capable of lock-step execution with a corresponding one or more instruction execution pipeline peers.

Figure 4:
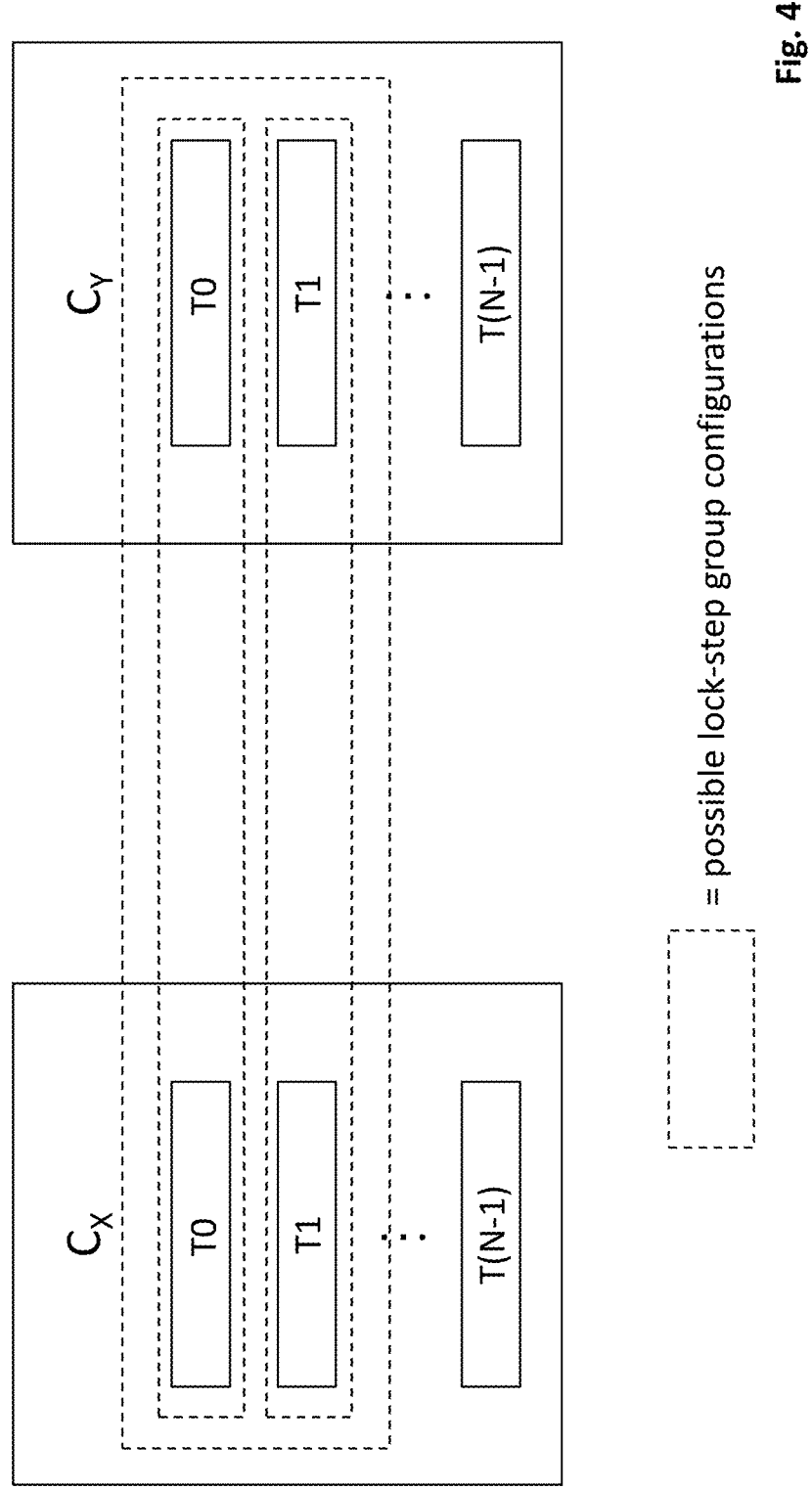
FIG. 4 shows possible lock-step group configurations.

According to one approach, the lock-step partner/peer of an instruction execution pipeline within a particular core can be configured to be the same, corresponding instruction execution pipeline within another (e.g., neighboring) core. For example, as observed in FIG. 4, there are N instruction execution pipelines per core. Here, the lock-step peer of pipeline T0 in core C0 can be pipeline T0 in core C1 (e.g., T0_C0=active, T0_C1=shadow), the lock-step peer of pipeline T1 in core C0 can be pipeline T1 in core C1 (e.g., T1_C0=active, T1_C1=shadow), etc. Moreover, larger symmetrical lock-step groups having multiple active and shadow processing entities can be configured (e.g., T0/T1_C0=active, T0/T1_C1=shadow).

FIGS. 5a through 5e elaborate on further lock step groups that can be defined with the improved processor of FIG. 3a.

Figure 5A:
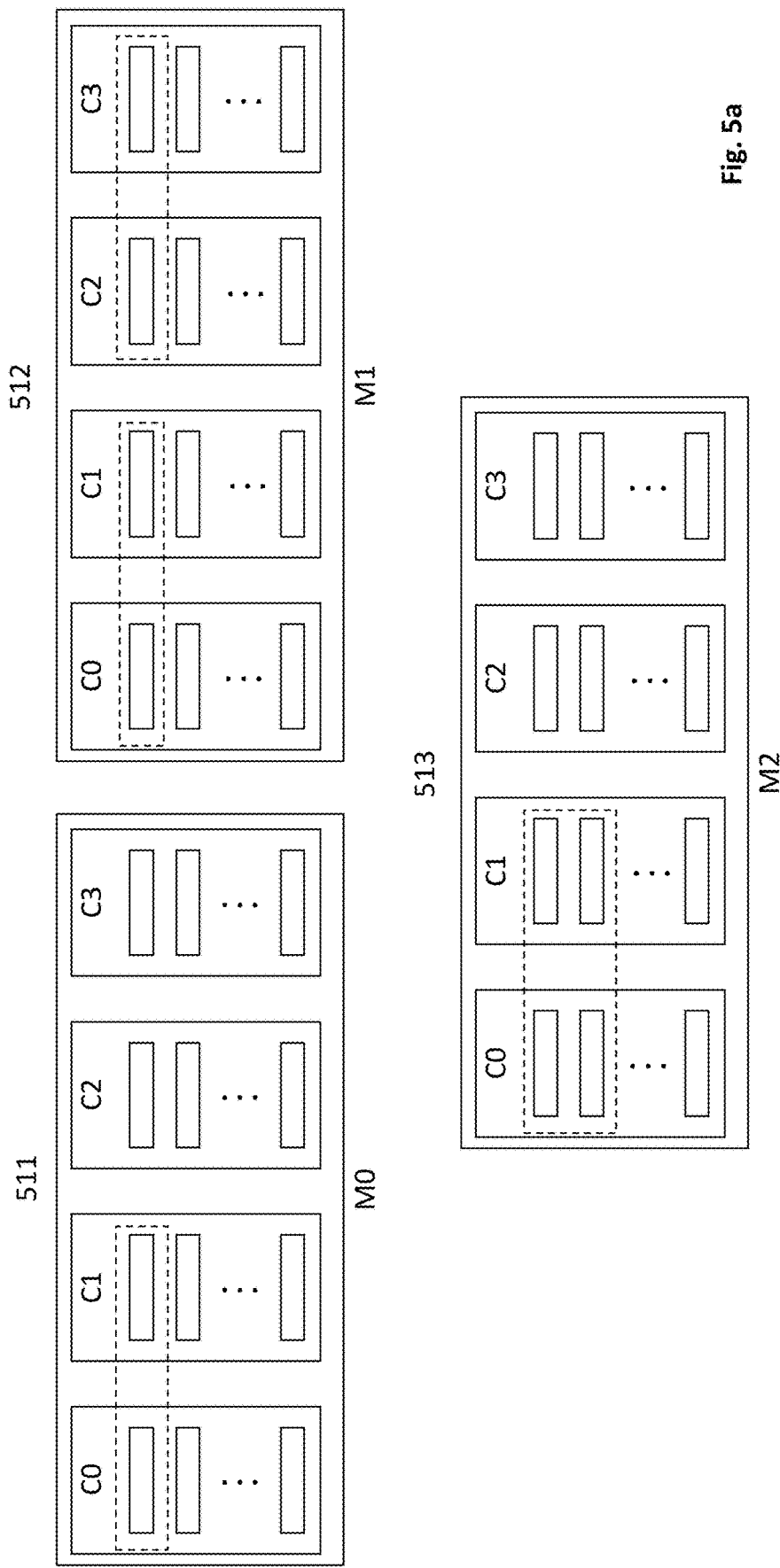

FIG. 5a shows three different lock-step group configurations 511, 512, 513 across three different modules M0-M2 that can be arranged with instruction execution pipelines as the processing entities. In a first configuration 511 only one instruction execution pipeline per core is a processing entity for lock-step purposes. In this case, the pipeline from one core is the active processing entity and the pipeline from the other core is the shadow processing entity. Configuration of a lock-step group consisting of only two pipelines may be suitable, for instance, if the corruption sensitive routine is a relatively simplistic single thread software process.

A second configuration 512 duplicates the lock-step activity of configuration 511 by including two different lock-step groups that both consume one pipeline as the active processing entity and another pipeline as the shadow processing entity. Here the active processing entity is a pipeline from C0 and C2 for the two different groups, respectively, and, the shadow processing entity is a pipeline from C1 and C3 for the two different groups, respectively. This particular configuration 512 may be useful, for instance, if there are two isolated and concurrent corruption sensitive processes that each consume a single thread.

A third configuration 513 includes four pipelines in a single lock-step group. Here, two pipelines in C0 are the active processing entities while two, corresponding pipelines in C1 are the shadow processing entities. Configuration of a lock-step group consisting of four pipelines as depicted in configuration 513 may be suitable, for instance, if the corruption sensitive routine is a more complex routine that, e.g., concurrently consumes two hardware threads.

Here, any of configurations 511, 512, 513 may be defined by programming the appropriate definition in the MSR register space 311, 312, 313 of each of the affected pipelines. Other combinations of lock-step groups defined at the pipeline level can be configurably defined, e.g., through MSR register space as described in more detail below.

The number of pipelines per core that can be configured as part of a lock-step group can also vary from implementation to implementation. For example, a first multi-core processor may be designed so that each/all of the pipelines in a core can be individually assigned as a processing entity within a lockstep group. By contrast, the cores of another multi-core processor (or other cores of the first multi-core processor) may be designed so that less than all of the pipelines in a core can be uniquely assigned as a processing entity within a lockstep group.

The configurations 511, 512, 513 of FIG. 5a indicate that active and shadow pipelines of a same lock-step group are never in a same core. Although this approach might eliminate corruptions associated with manufacturing related defects (in which pipelines in a same core are apt to exhibit same corruptions), nevertheless, in alternate architectures, pipelines within a same core can be named active and shadow pipelines of a same lock-step group.

Figure 5B:
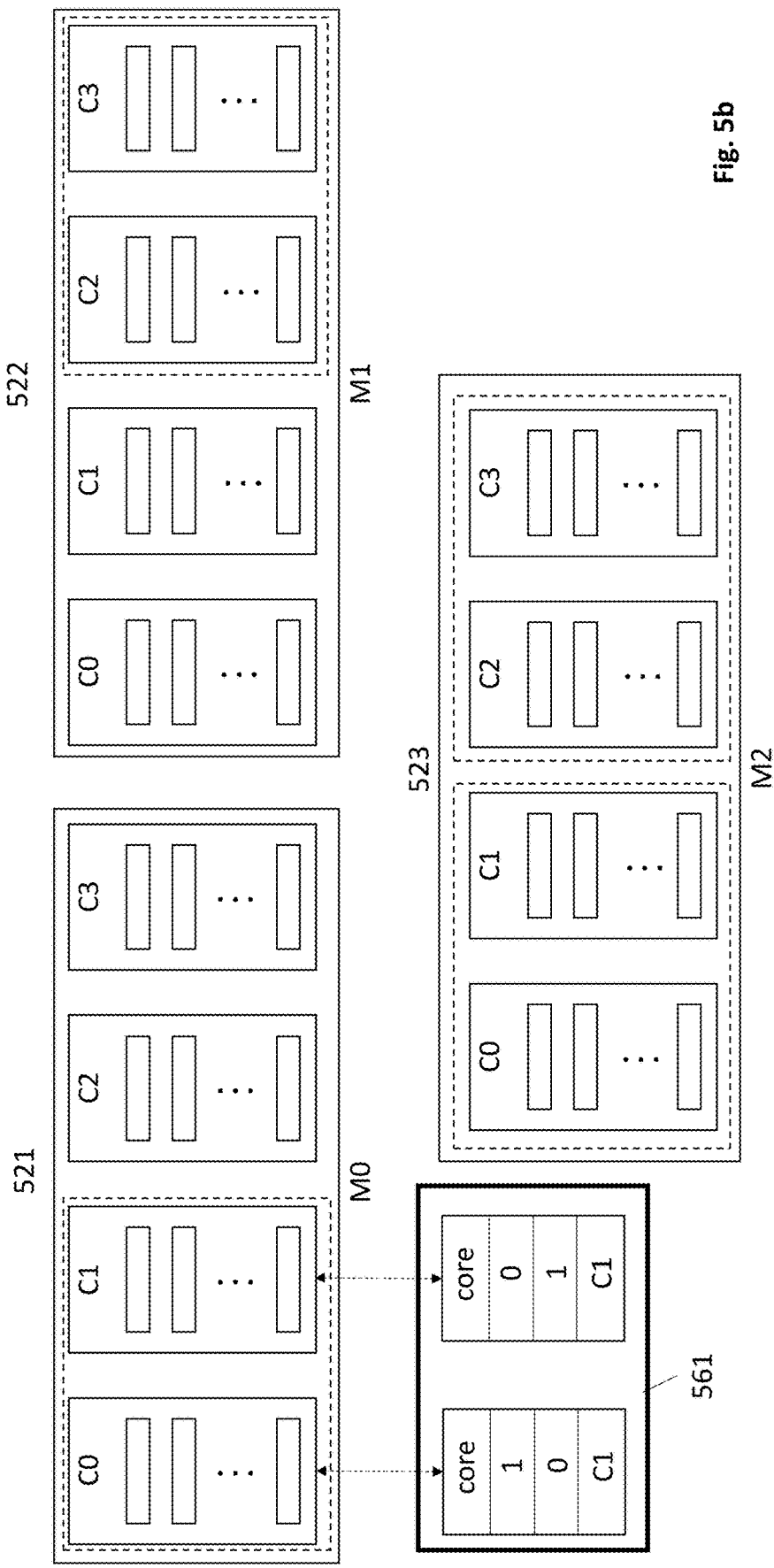

Whereas FIG. 5a shows different lock-step groups having processing entities at pipeline granularity, by contrast, FIG. 5b shows three lock-step groups 521, 522, 523 having processing entities at core granularity ("core granularity"). Configuration 521 shows a first configuration where C0 and C1 form a lock-step group, configuration 522 shows a second configuration where C2 and C3 form a lock-step group, and, configuration 523 shows a third configuration where C0 and C1 form a first lock-step group and C2 and C3 form a second lock-step group. In configuration 523, the C0/C1 lock-step group execute a first, corruption sensitive process while the C2/C3 lock-step group concurrently execute a second, different corruption sensitive process. In an embodiment, when a lock-step group is defined at core granularity, all pipelines within a core are available to execute instructions during lock-step execution. Such configurations can be appropriate under a number of circumstances, e.g., when the corruption sensitive process to be verified consumes an entire core.

Figure 5C:
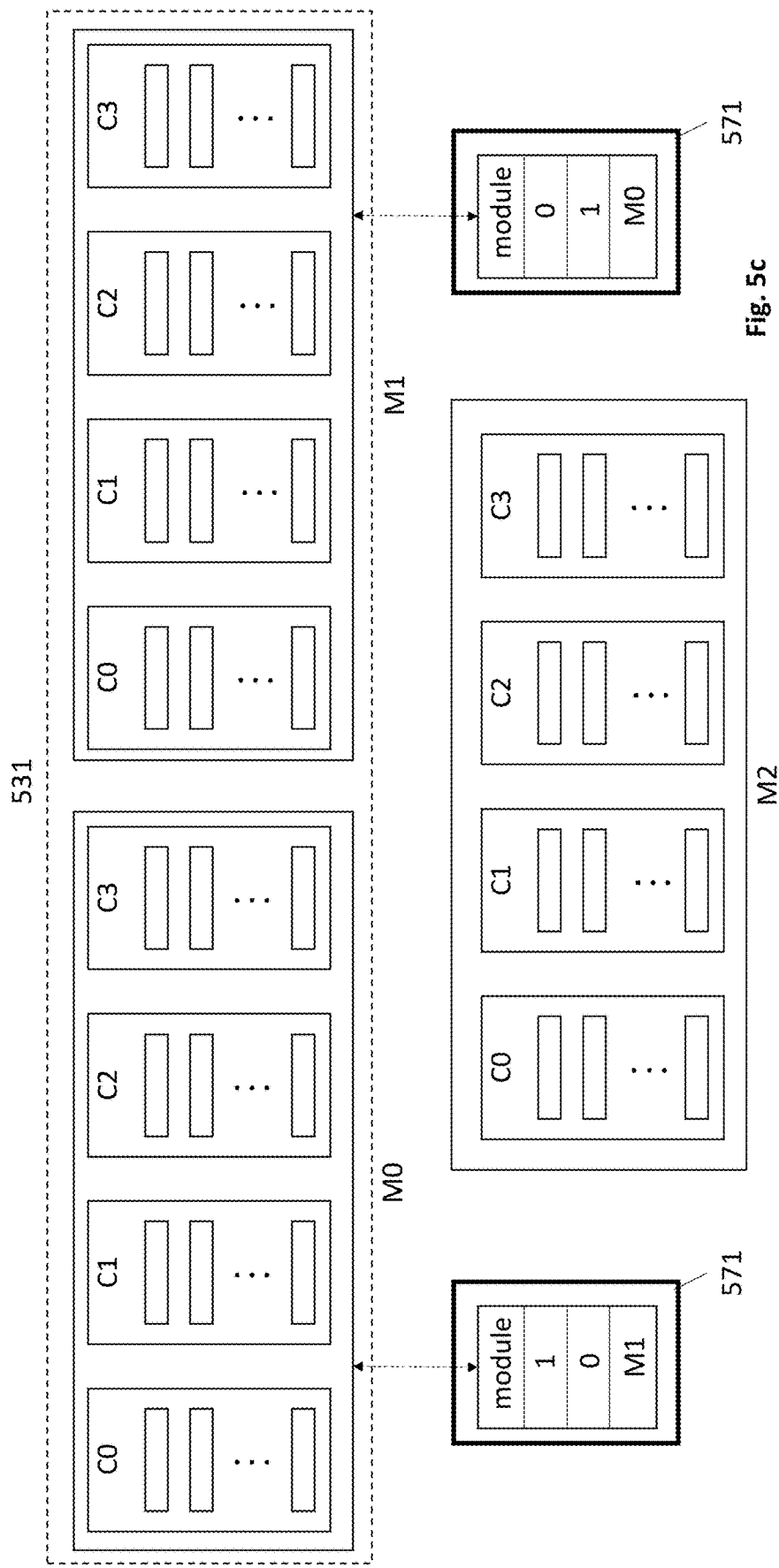

FIG. 5c shows a lock step group configuration 531 having processing entities at module granularity ("module granularity"). Here, a lock-step group is formed in which C0/C1/C2/C3 of a first module M0 correspond to the active processing entity and C0/C1/C2/C3 of a second module M1 correspond to the shadow processing entity. Even larger module granularity lock-step groups can be configured that consist of an additional number of active modules and an equal number of additional shadow modules. In an embodiment, when a lock-step group is defined at module granularity, all cores in a module, and all pipelines within a core are available to execute instructions during lock-step execution.

FIG. 5d shows another lock step group configuration 541 having processing entities at tile granularity ("tile granularity"). In particular, FIG. 5d shows a first tile T0 acting as the active processing entity and a second tile T1 acting as the shadow processing entity. Here, a tile consists of multiple modules. Larger tile granularity lock-step groups can consist of an additional number of active tiles and an equal number of additional shadow tiles. In an embodiment, when a lock-step group is defined at tile granularity, all modules in a tile, all cores in a module, and all pipelines within a core are available to execute instructions during lock-step execution.

Figure 5E:
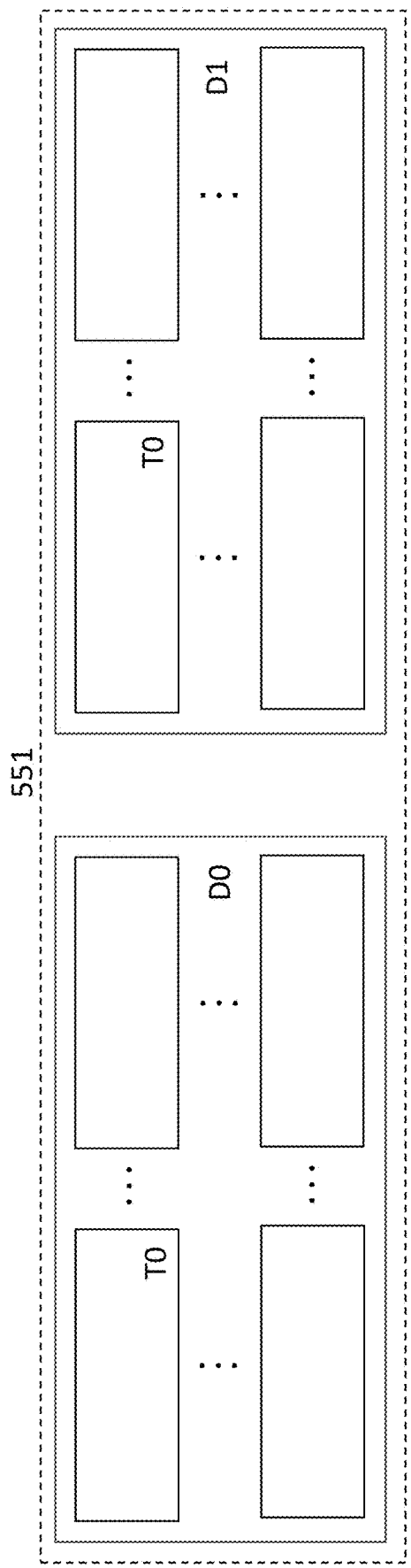

FIG. 5e shows another lock step group configuration 551 having processing entities at die granularity ("die granularity"). In particular, FIG. 5e shows a first die D0 acting as the active processing entity and a second die D1 acting as the shadow processing entity. Here, a die corresponds to an entire semiconductor chip and consists of multiple tiles. Larger die granularity lock-step groups can consist of an additional number of active dies and an equal number of additional shadow dies. In an embodiment, when a lock-step group is defined at die granularity, all tiles within a die, all modules in a tile, all cores in a module, and all pipelines within a core are available to execute instructions during lock-step execution.

In order to configure/define lock-step groups in any of the granularities discussed above, in various embodiments, referring back to FIG. 3a, lock step group definition MSR space 311, 312, 313 exists for each processing entity in the lock-step group. More formally, a first MSR register 311 is referred to as the lock-step group definition (LSGD) MSR. A second MSR register 312 is referred to as the lock-step mode enable (LSME) MSR. A third MSR register 313 is referred to as the lock step group state (LSGS) MSR. A fourth MSR register 314 is referred to as the lock step break status (LSBS) MSR. Importantly, in various embodiments, each of the MSRs are visible to software and, for certain register space, can be written to by software so that software can understand and control the processor's lock step activity.

FIG. 6a shows an embodiment 611 of the LSGD MSR 611. According to an embodiment, there is one instance of the LSGD MSR for each processing entity in a lock step group. As observed in FIG. 6, a first field 601 specifies the granularity level of the processing entity's lock-step group (pipeline, core, module, tile or die). A second field 602 specifies whether the processing entity is allowed to participate as an active processing entity within the lock-step group. A third field 603 specifies whether the processing entity is allowed to participate as a shadow processing entity within the lock step group. A fourth field 604 identifies the peer/partner of the processing entity within the lock step group.

In an embodiment, the LSGD MSR 611 is a read-only register that specifies what lock-stepping capability the underlying hardware is designed to support for the processing entity (e.g., the LSGD is an enumerate MSR that specifies machine capability). Here, the processor hardware needs to have the appropriate circuitry between processing entities of a same lock-step group in order for that lock-step group to physically exist (comparators, state replication and broadcast circuitry, etc.). Thus, the LSGD MSR 611 essentially describes the underlying hardware processor design.

Here, in an embodiment, the processor hardware is designed such that separate instances of the LSGD MSR space 611 exist for each instruction execution pipeline in a core that can operate as a processing entity in a lock-step group having pipeline granularity. The LSGD MSR space of one of these pipelines also serves as the LSGD MSR space for the pipeline's core if the core is to be a processing entity within a lock-step group having processing entities at core granularity. One of the "core" LSGD MSR instances amongst the cores in a same module also serves as the "module" LSGD MSR space for the module if the module is to be a processing entity within a lock-step group whose processing entities have module granularity.

The hierarchy then continues with one module level LSGD MSR amongst multiple module level LSGD MSRs within a same tile being used as the LSGD MSR space for the module's tile when the tile is to be a processing entity within a lock-step group having tile granularity, and, one tile level LSGD MSR amongst multiple tile LSGD MSRs within a same die being used as the LSGD MSR space for the die when the die is a processing entity within a lock-step group having die granularity.

As an example, FIG. 5b shows the corresponding LSGD MSR register space 561 for configuration 521 of FIG. 5b. With respect to configuration 521 of FIG. 5b, there is separate LSGD MSR space for both core C0 and core C1. Here, the level field 601 and peer field 604 of these MSRs indicate that a core granularity lock step group is formed from cores C0 and C1. The active field 602 and shadow field 603 of these MSRs indicate that core C0 is the active processing entity and core C1 is the shadow processing entity.

As another example, FIG. 5c shows the corresponding LSGD MSR register space 571 for configuration 531 of FIG. 5c. With respect to configuration 531 of FIG. 5c, there is separate LSGD MSR space for both module M0 and module M1. Here, the level field 601 and peer field 604 of these MSRs indicate that a module granularity lock step group is formed from modules M0 and M1. The active field 602 and shadow field 603 of these MSRs indicate that module M0 is the active processing entity and module M1 is the shadow processing entity.

The role/use of the LSME and LSGS MSRs 312, 313 in conjunction with the use of the LSGD MSR 311 is best explained through an example. As such, FIGS. 7a. through 7i depict a method by which a lock-step group can enter lock-step mode. For ease of discussion, the method of FIGS. 7a through 7i assumes a lock-step group of core granularity with cores C0 and C2 being the active processing entities and cores C1 and C3 being the shadow processing entities (C1 is the shadow processing entity for C0 and C3 is the shadow processing entity for C2). However, consistent with the discussion above of FIGS. 4 and 5a-5e, the reader should understand that lock-step groups can be formed having different numbers/combinations of active and shadow processing entities. Moreover, lock-step groups can be formed whose processing entities are defined at a granularity other than core granularity.

Figure 7A:
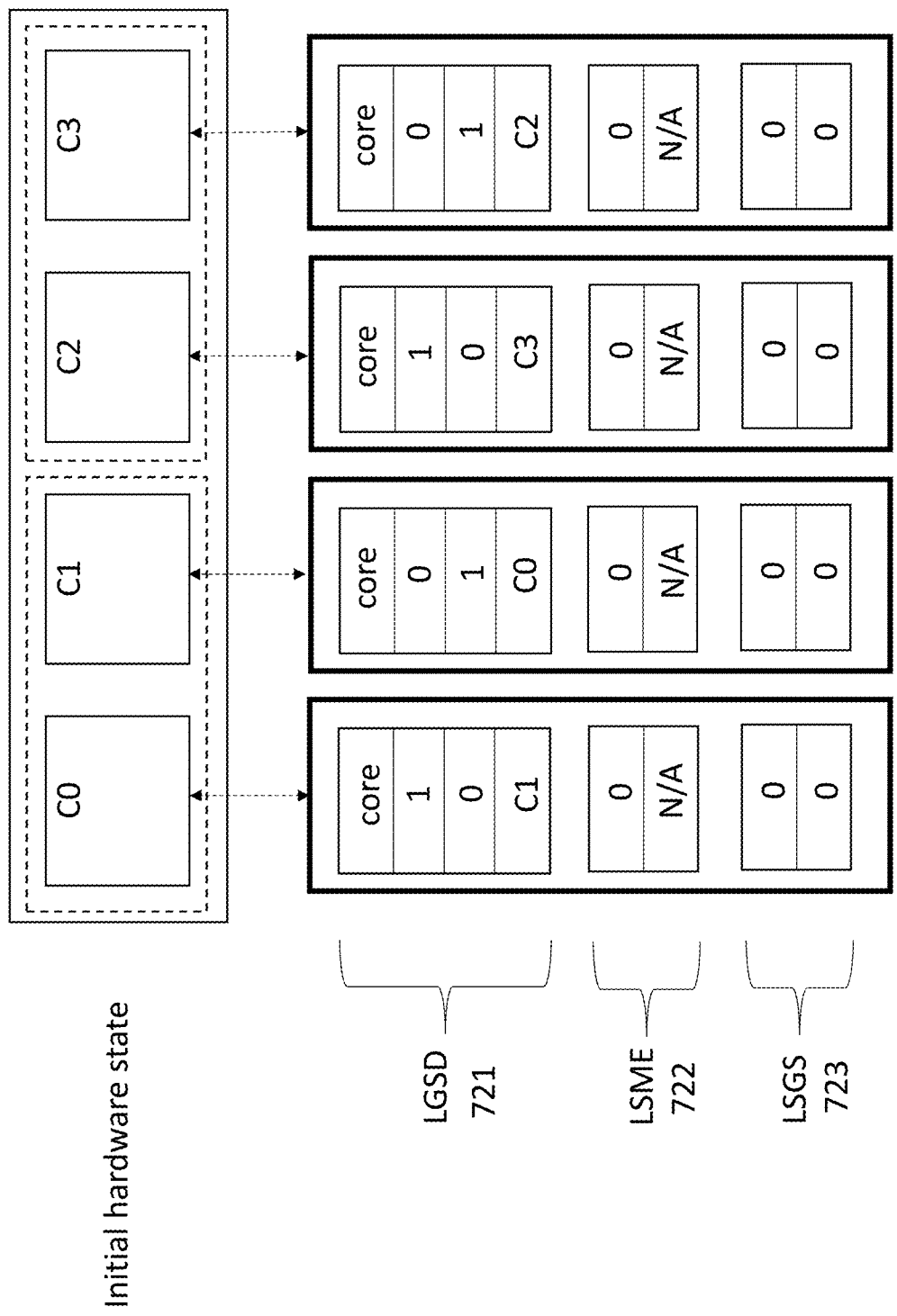

As observed in FIG. 7a, the method begins with the state of the LSGD MSR space 721 being defined in the processor. As observed in FIG. 7a, the respective LGSD MSR 721 for cores C0 and C2 indicate that these cores can only be active cores. By contrast, the respective LGSD MSR 721 for cores C1 and C3 indicate that these cores can only be shadow cores. Moreover, the respective LGSD MSR 721 for C0 and C1 indicate that C0 and C1 are lock-step peers, and, that C2 and C3 are lock-step peers.

Figure 7B:
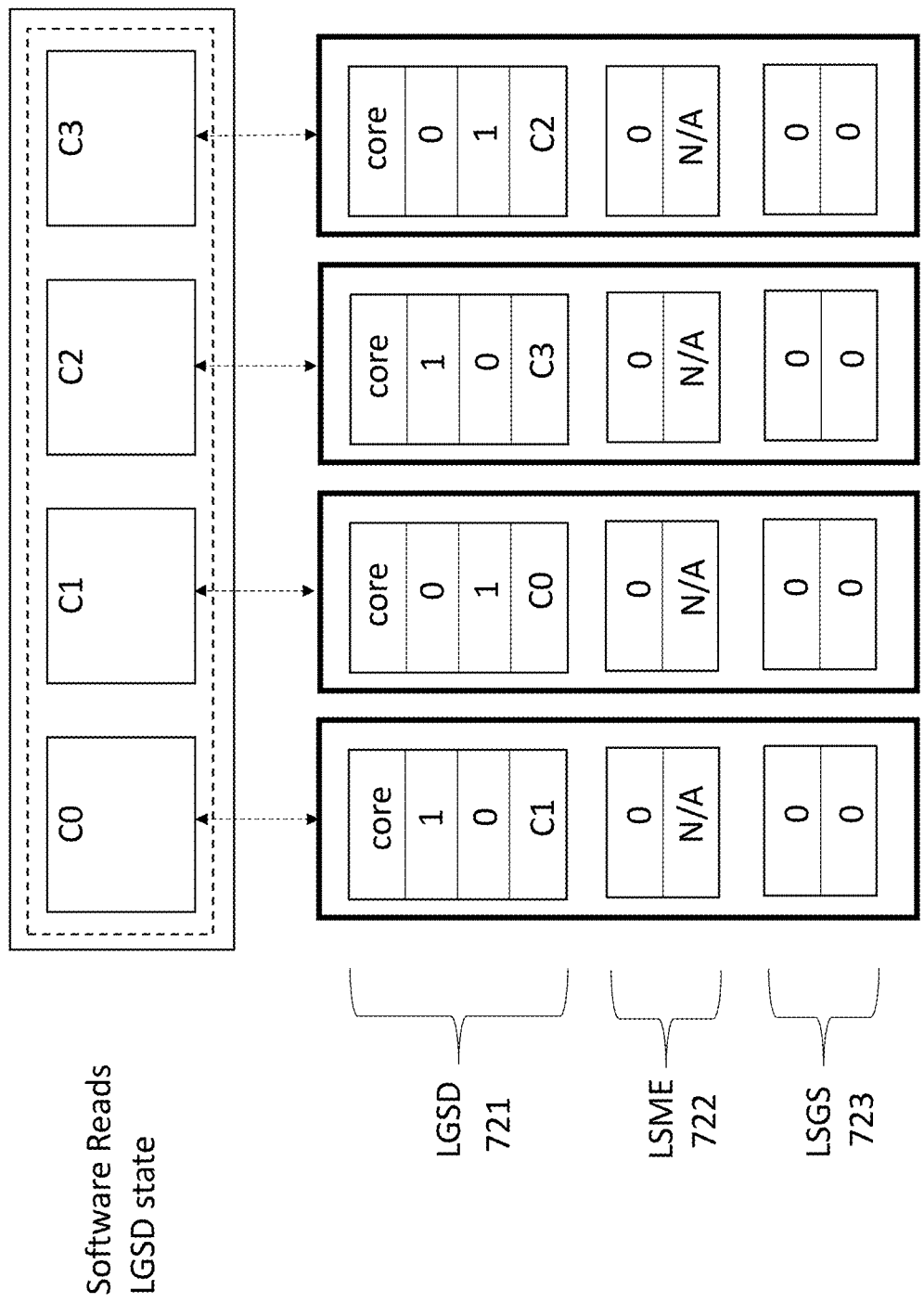

Then, as observed in FIG. 7b, software reads the LSGD MSR space 721 to understand the lock-step capabilities of the cores. The read of the LSGD MSR space 721 by software can be triggered by program code executing on C0 and/or C2 realizing that it is about to execute corruption sensitive code. After this trigger event, the LGSD space for all cores (C0, C1, C2, C3) is read to understand their respective lock-step capabilities.

Figure 7C:
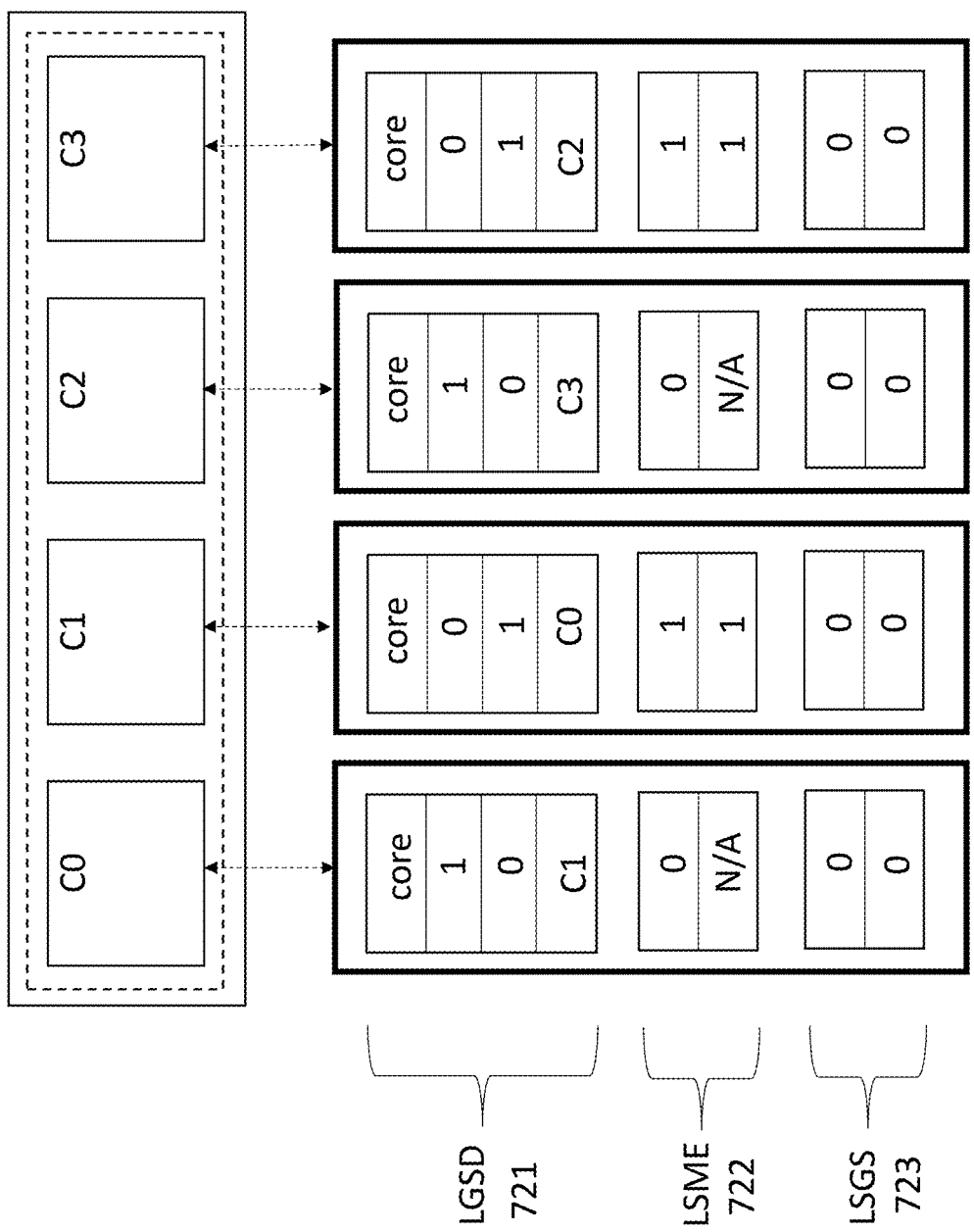

Referring to FIG. 7c, after the software understands the lock-step capabilities of the cores, the software begins to configure the desired lock-step group in the LSME MSR space 722 consistent with their capabilities. In particular, software executing on both of the shadow processing entities C1, C3 proceed to request entrance of lock step mode by writing to their respective lock-step mode enable (LSME) MSR register space 722.

An embodiment of the LSME MSR is depicted in FIG. 6b. As observed in FIG. 6b, the LSME MSR is a two bit MSR that reserves a first bit 611 to indicate whether or not the processing entity is in lock step mode, and, reserves a second bit 612 to indicate whether the processing entity is to be an active processing entity or is to be a shadow processing entity.

Here, referring back to FIG. 7c, LSME MSR register space 722 exists for each processing entity, and, as explained in more detail immediately below, each processing entity's state, in terms of being in lock step mode or not being in lock step mode, is defined in part by the state of its LSME MSR register space 722.

As observed in FIG. 7c, the processing entities that are to be shadow processing entities in the lock-step group (i.e., cores C1 and C3) request lock-step activation in their respective LSME MSR register space 722 before the active processing entities C0, C2. Here, in various embodiments, the active processing entities C0, C2 are already scheduled to execute the corruption sensitive instruction sequence as part of their normal/nominal software execution process. That is, for example, during nominal execution the active processing entities C0, C2 are executing instructions for, e.g., a first software application, and, the shadow processing entities C1, C3 are executing instructions for, e.g., a second different software application that, e.g., has little/no relationship with the first software application. Alternatively, either or both of C1 and C3 can be idle. For ease of explanation the remainder of the discussion assumes C1 and C3 are actively executing instructions just before the lock-step group is formed.

The first software application is written or is otherwise configured to recognize when it is about to execute a corruption sensitive instruction sequence. As such, the first software application essentially requests the formation and activation of the lock-step group which results in the lock-step group definition being written into the LSME MSR space 722. After the lock-step group is formed and lock-step mode begins (as explained further below), the first software program then goes forward with executing the corruption sensitive sequence on the active processing entities C0, C2 as per nominal configuration (the active processors are the processors assigned to execute the first software program).

By contrast, the second software program, having potentially no relationship to the first software program, essentially has to be temporarily parked so that its processing entities (the shadow processing entities C1, C3) can be dedicated to double-checking the active processing entities C0, C2 in lock-step mode. Alternatively, the second software program may be rescheduled and placed onto different cores if such cores are available. For ease of discussion, the remaining discussion will assume the second software program is parked.

Thus, whereas the first software program can be written or otherwise configured to plan on lock-step mode when the corruption sensitive instructions are about to be executed, by contrast, the second software program receives an unexpected interrupt and needs to temporarily park its execution.

Here, because the significance of the interrupt to the second software program is unpredictable, the sequence for activating lock-step mode initially places the shadow processors C1, C3 in lock-step mode before the active processing entities C0, C2 to ensure that the shadow processing entities C1, C3 are, in fact, available for lock-step mode and can be properly configured to enter lock-step mode.

Figure 7D:
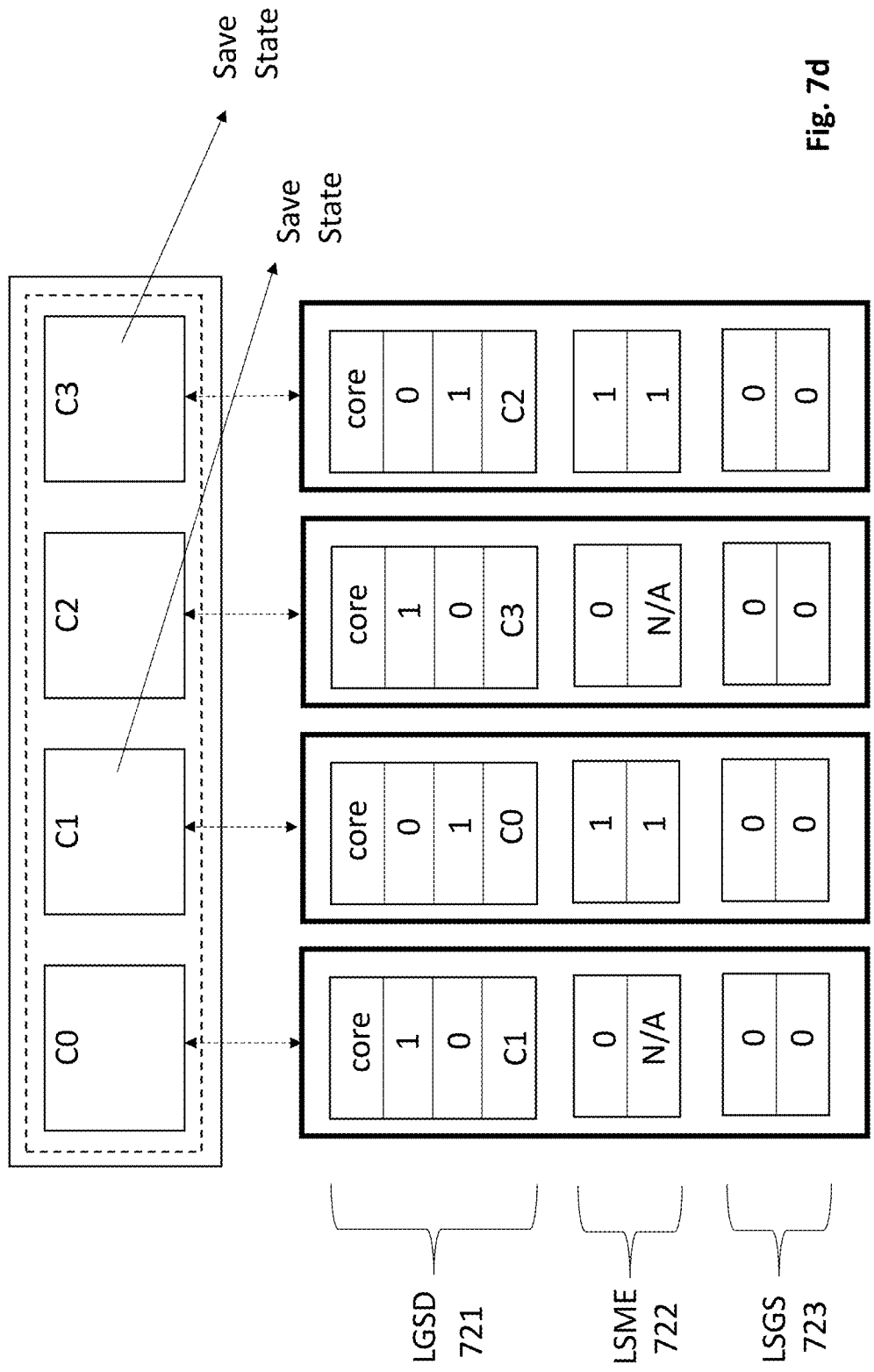

As such, as observed in FIG. 7d, after the shadow logic processors C1, C3 request activation in their respective LSME MSR register space 722, in response to the write to the LSME MSR, processor hardware begins to externally save the state of the shadow processing entities and place them into a special "wait for lock step" sleep state. In an embodiment, the saving of the state and the entry into the special sleep state is akin to a C6 entry in which, e.g., a check point is marked in the state and the state is saved in on-die SRAM. Alternatively or in combination the check pointed state may be saved elsewhere (e.g., to cache, memory or non volatile storage).

Meanwhile, the active processing entities C0, C2 observe the state of their respective lock-step group status (LSGS) MSR register space 723 to understand when the shadow processing entities C1, C3 are in the special sleep state and ready for lock-step mode. FIG. 6c shows an embodiment of the LSGS MSR register space. Here, as explained in more detail below, a first field 613 indicates whether all of the shadow processors in the lock step group have requested lock step mode entry and have successfully saved their state and entered the special sleep state. As observed in FIG. 7d, the first field in the LSGS MSR space 723 is a 0 which means not all of the shadow processors in the lock step group have saved their state and are in the special sleep state ready to enter lock-step.

As observed in FIG. 7e, one shadow processing entity (C3) has completely saved its state and is in the sleep state ready to enter lock-step. However, the other shadow processing entity (C1) has not yet completely saved its state and entered the sleep state. As such, the first field of the LSGS MSR for both active processing entities continues to indicate that the shadow processing entities are not yet ready for lock-step mode entry (first field of LSGS MSR=0).

Figure 7F:
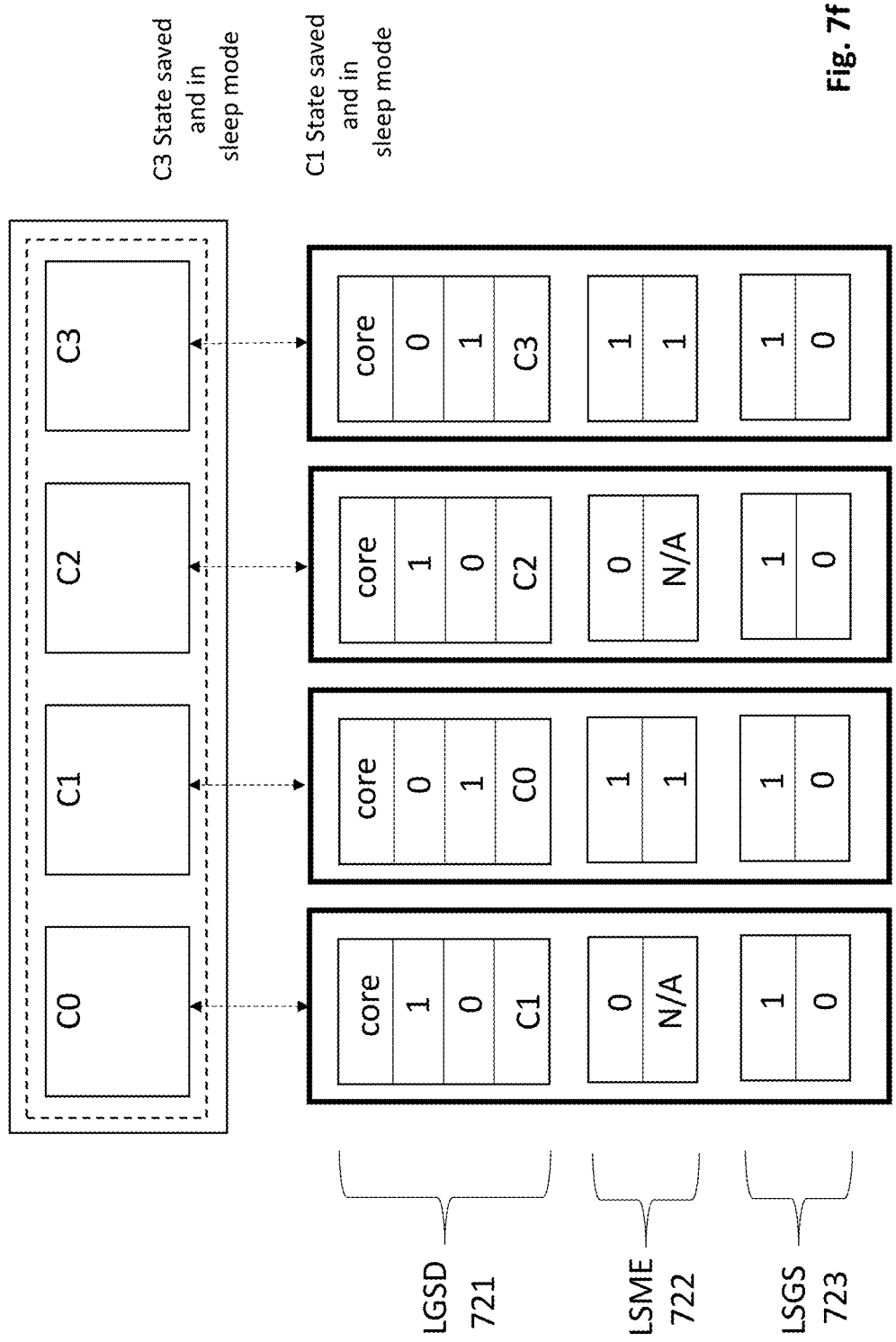
Figure 7G:
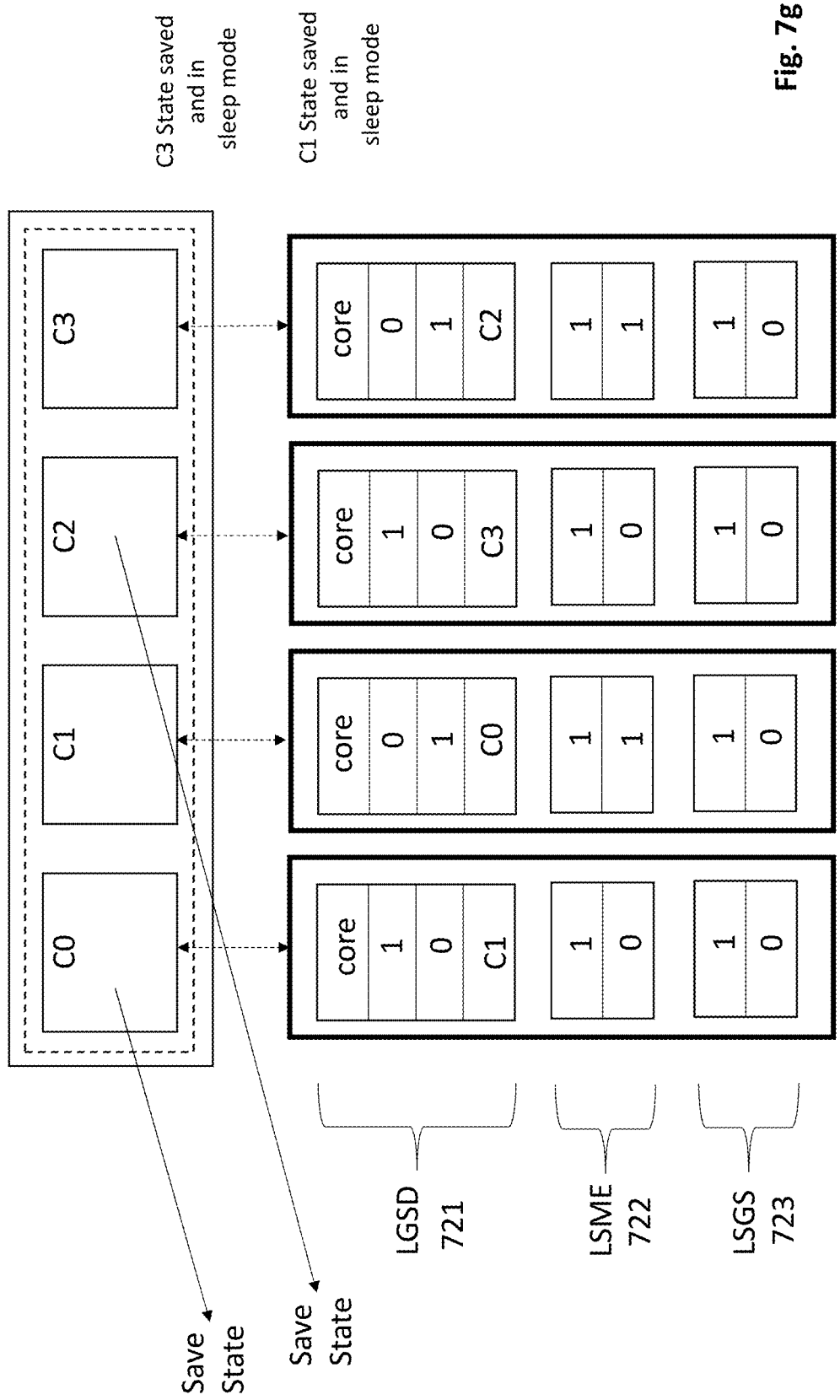

As observed in FIG. 7f, the remaining shadow logic processor (C1) has successfully saved its state, at which point, the processor hardware flips the bit in first field of the LSGS MSR 723 to indicate that the shadow processing entities are now in the special sleep state and ready to enter lock-step mode. In response to the bit flip, as observed in FIG. 7g, the respective software executing on both active processing entities C0, C2 request to be active processing entities by writing to their respective LSME MSR register space 721. In response to the write to the LSME MSR, the processor starts to externally save the state of the active processing entities C0, C2.

Figure 7H:
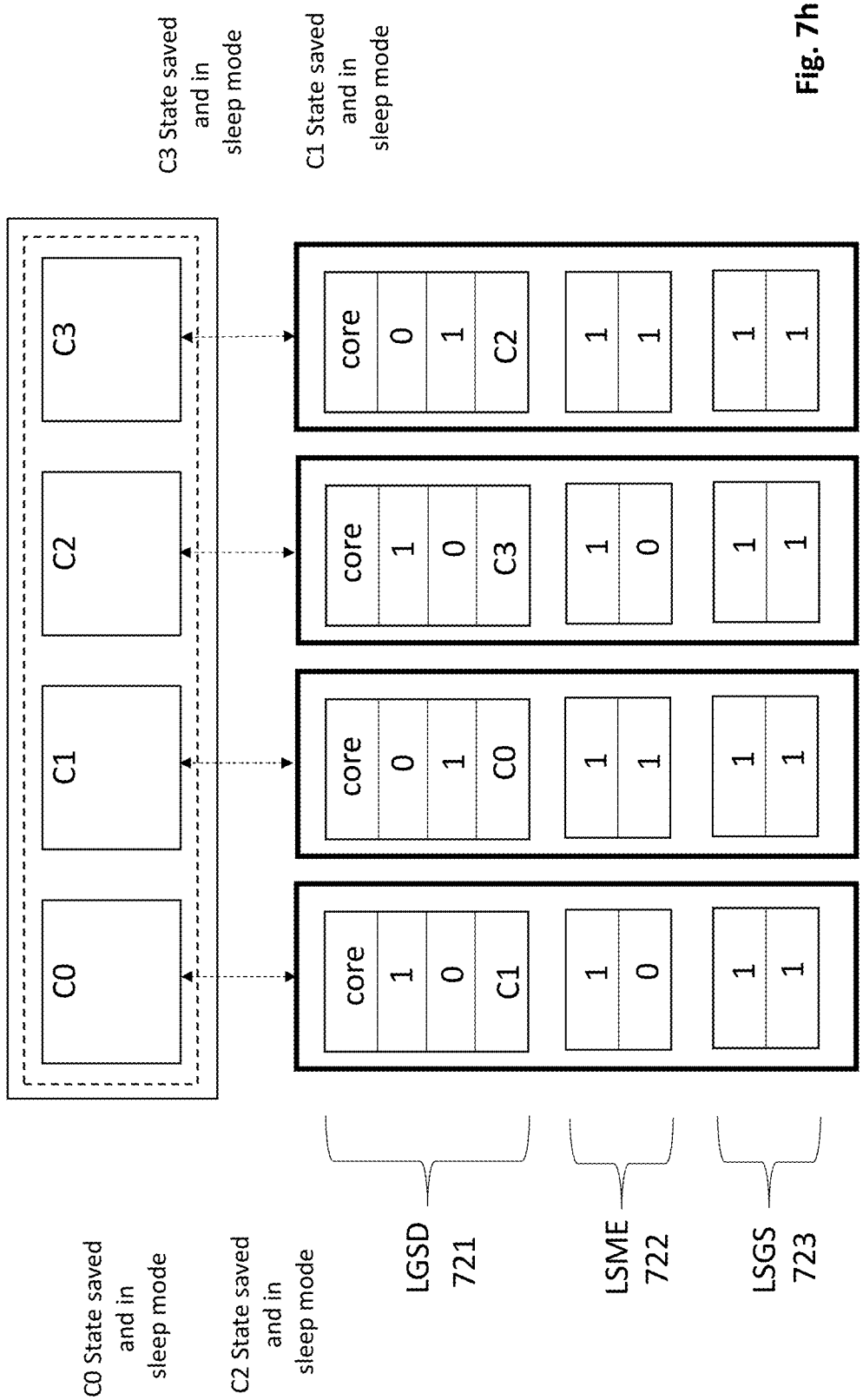

As observed in FIG. 7h, both active processing entities C0, C2 have externally saved their state and entered a sleep state, which, in turn, causes the hardware to flip the bit in the second field 614 of the LSGS MSR (observed in FIG. 6c). The flipping of the bit in the second field 614 of the LSGS MSR indicates that all processing entities have formally entered lock-step mode (the lock-step group to which each of the processing entities belong, is active). Moreover, in an embodiment, the flipping of the bit causes the processor hardware to enable the lock-step comparators and broadcast logic between core peers.

In alternate embodiments, the set of processing entities do not simultaneously enter lock-step mode, e.g., as a matter of definition or otherwise. For instance, according to one alternate embodiment, a processing entity is deemed to be in lock-step mode when its state has been saved and it is placed in the sleep state. Nevertheless, lock-step execution is not allowed to begin until all processing entities are in lock-step mode.

Figure 7I:
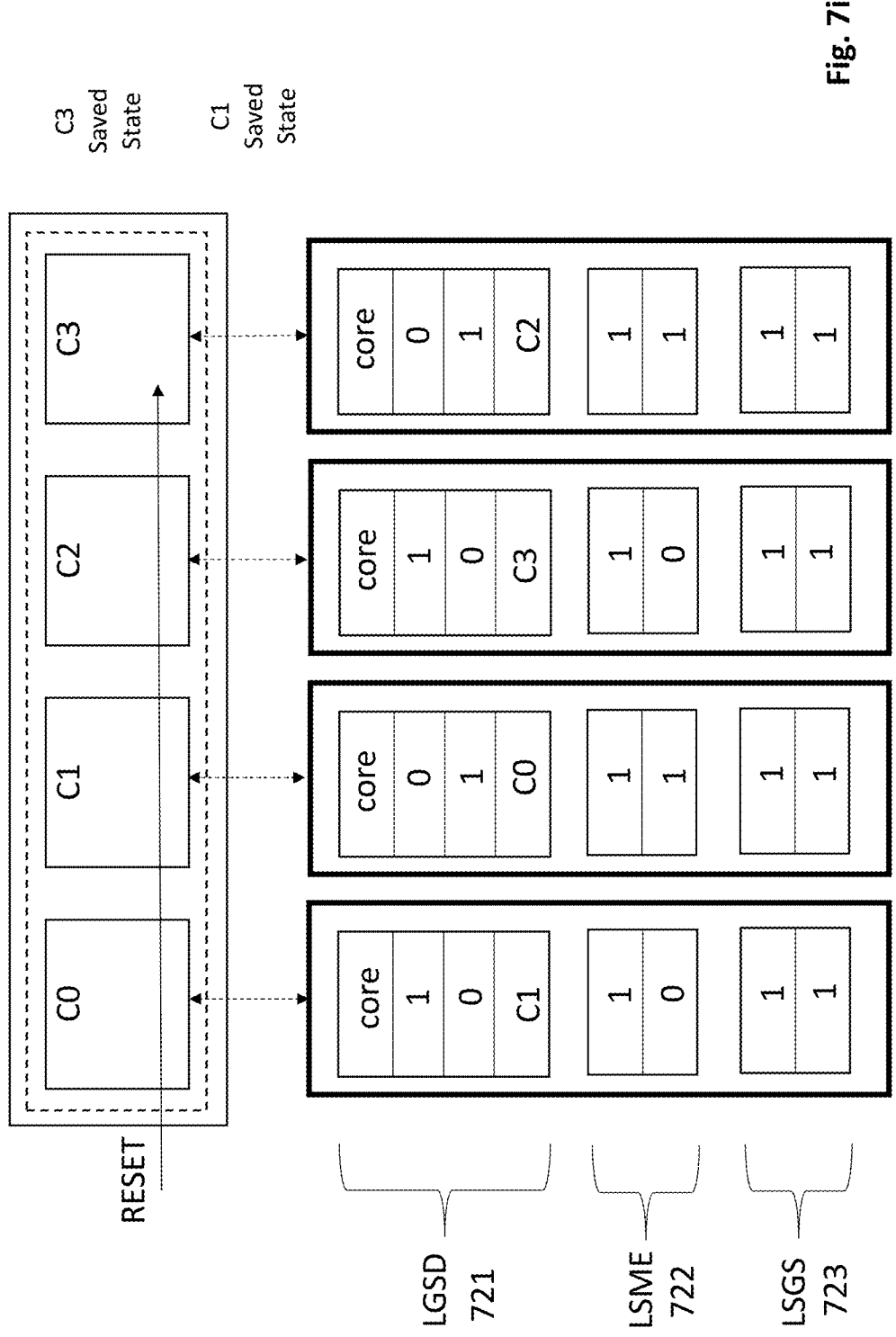

The processor hardware, also in response to the flipping of the bit in the second field 614 of the LSGS MSR, as observed in FIG. 7i, first asserts reset for each of the C0, C1, C2 and C3 processing entities and then, coming out of reset, configures the same register state and instruction pointer configuration for C0 and C2, and, the same register state and instruction pointer configuration for C1 and C3 so that C0 and C2 start from the same program location and C1 and C3 start from the same program location. The processors then being execution of their respective program sensitive code. Moreover, in an embodiment, unlike the traditional processor of FIG. 1 in which the BIOS reset was akin to a hard, platform reset, by contrast, in the improved approach presently described, the resets of FIG. 7i are local/core resets which do not consume as much time as a platform reset.

Figure 8A:
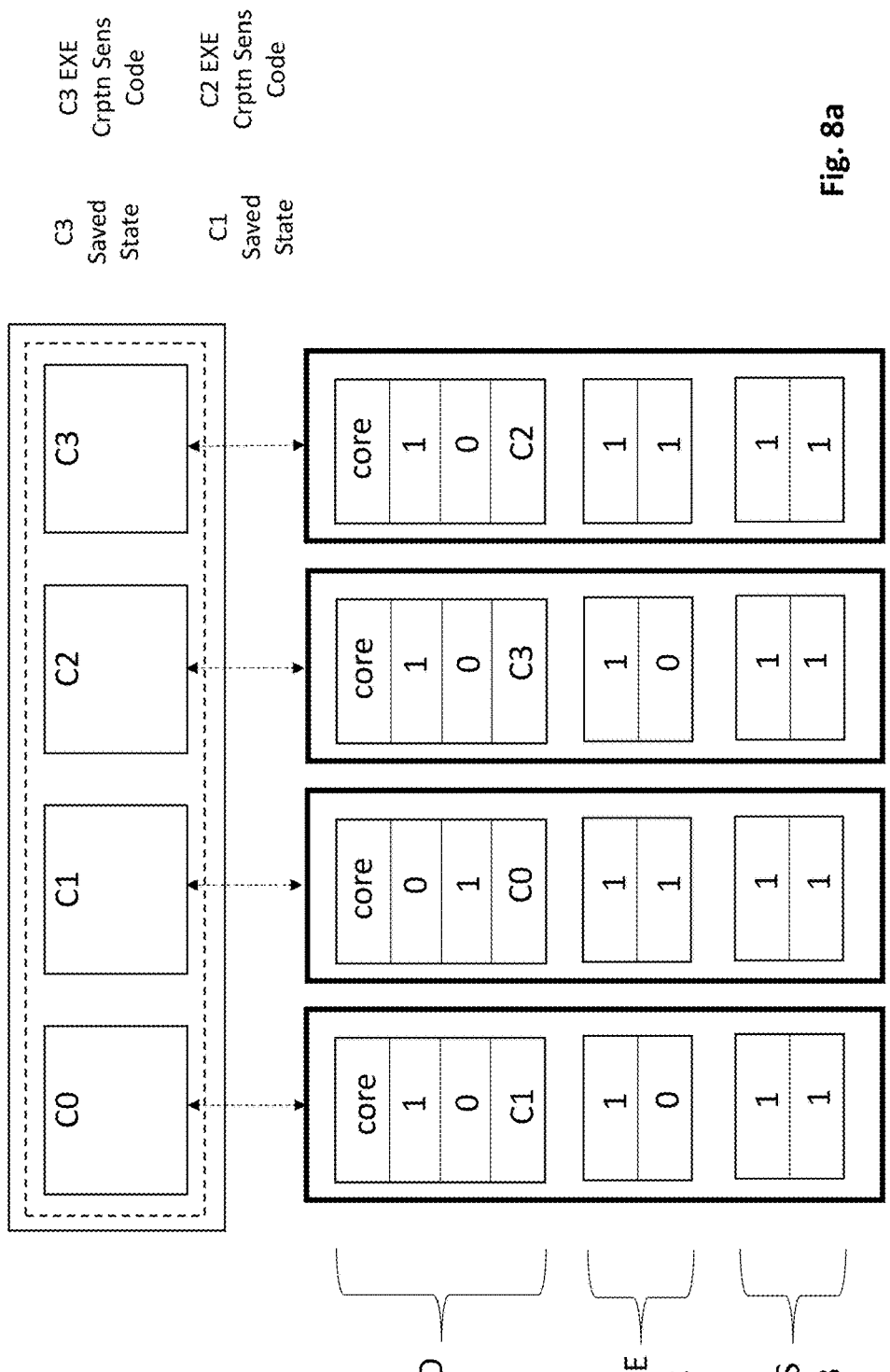
FIGS. 8a, 8b, 8c, 8d and 8e depict a process of exiting lock-step mode.
Figure 8B:
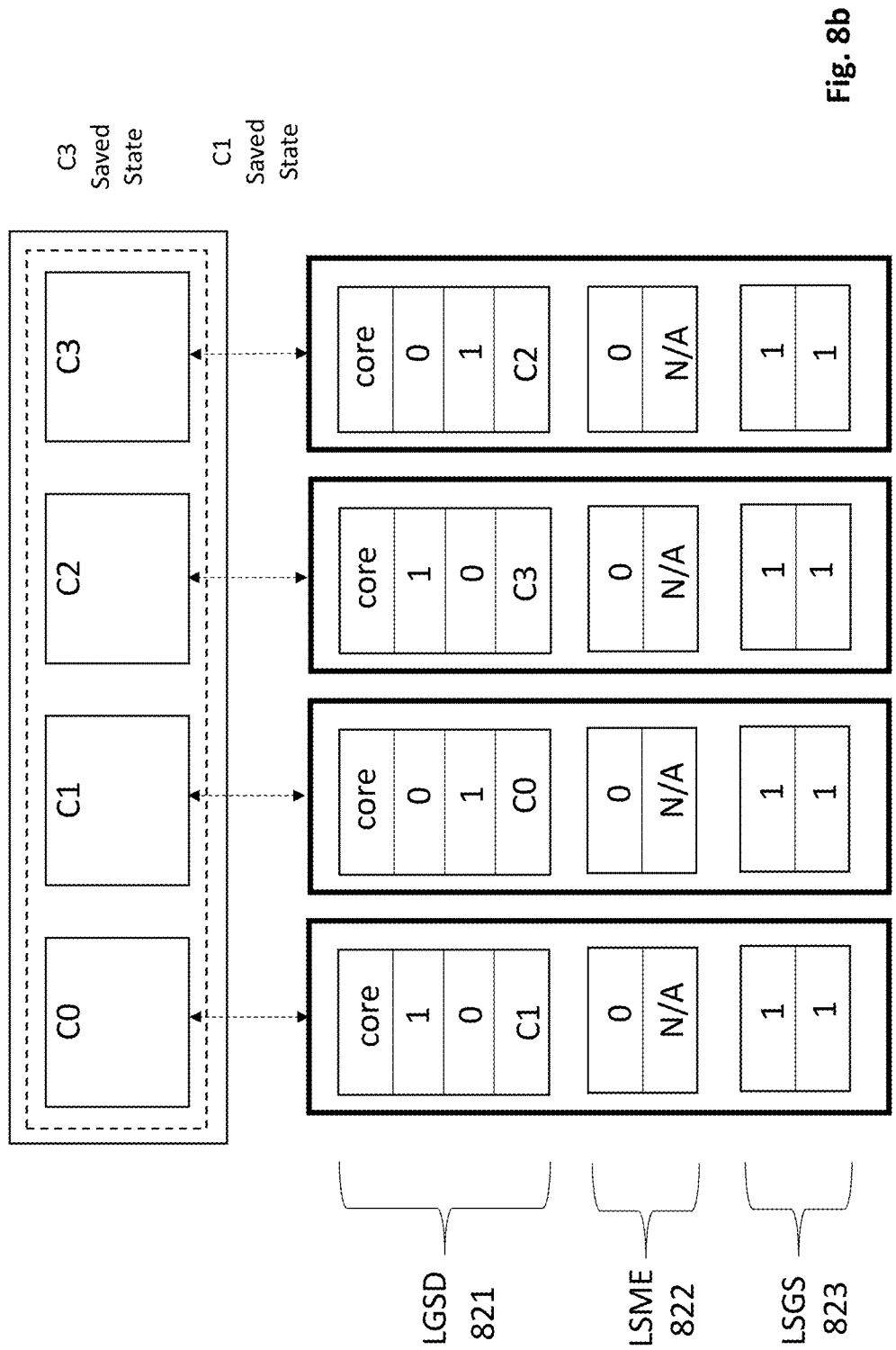

FIGS. 8a-8e continue with the above example and shows execution and shut down of lock-step mode followed by re-entry of the shadow processors back to their nominal operation. FIG. 8a shows both active processing entities and both shadow processing entities executing in lock-step. Referring to FIG. 8b, after execution of the corruption sensitive program code is complete (ideally, all processors execute the last instruction of the corruption sensitive program code during the same machine cycle), software on each processing entity writes to the first field of their respective LSME MSR register space 822 to request deactivation from lock-step mode.

Figure 8C:
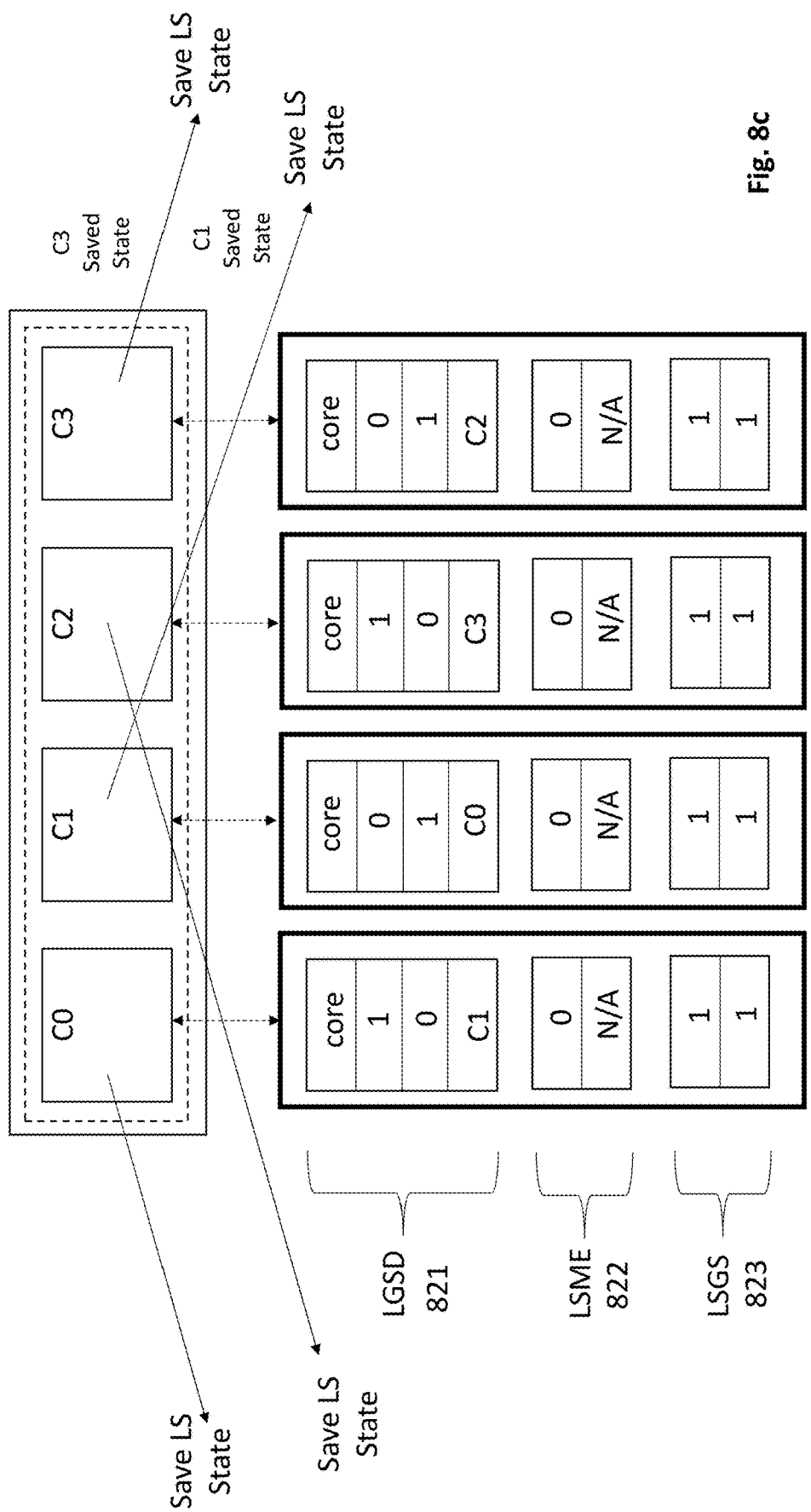
Figure 8D:
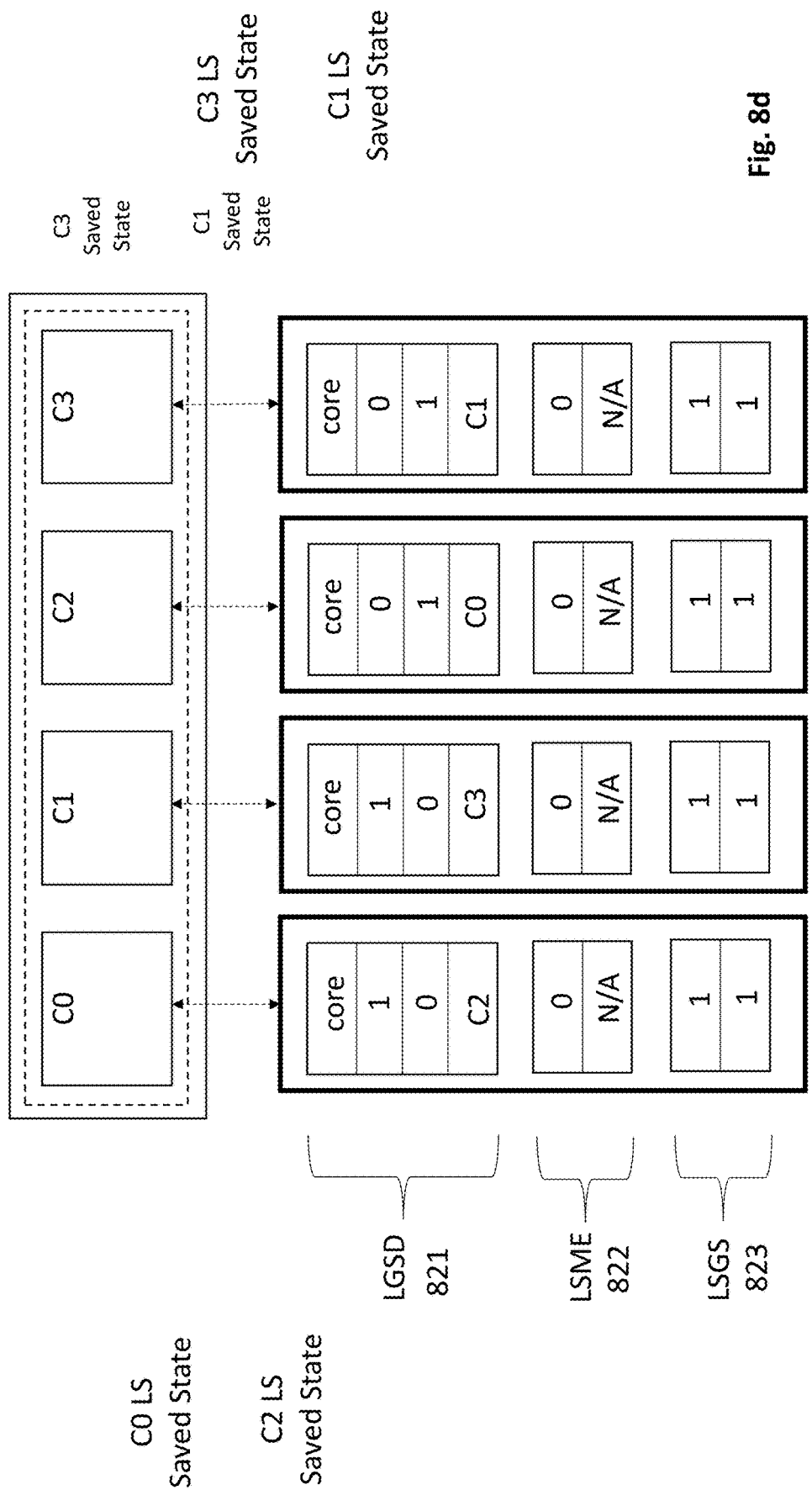

In response to the requests being written into the LSME MSR space 822, as observed in FIG. 8c, the processor hardware operates to externally save the state of each processing entity. In FIG. 8d, the lock step (LS) state of each processor has been externally saved. Here, the processor hardware and/or other software can study the saved state and determine that shadow processing entity execution was identical to active processing entity execution. If not, an error flag is raised. If so, the process continues to FIG. 8e.

Figure 8E:
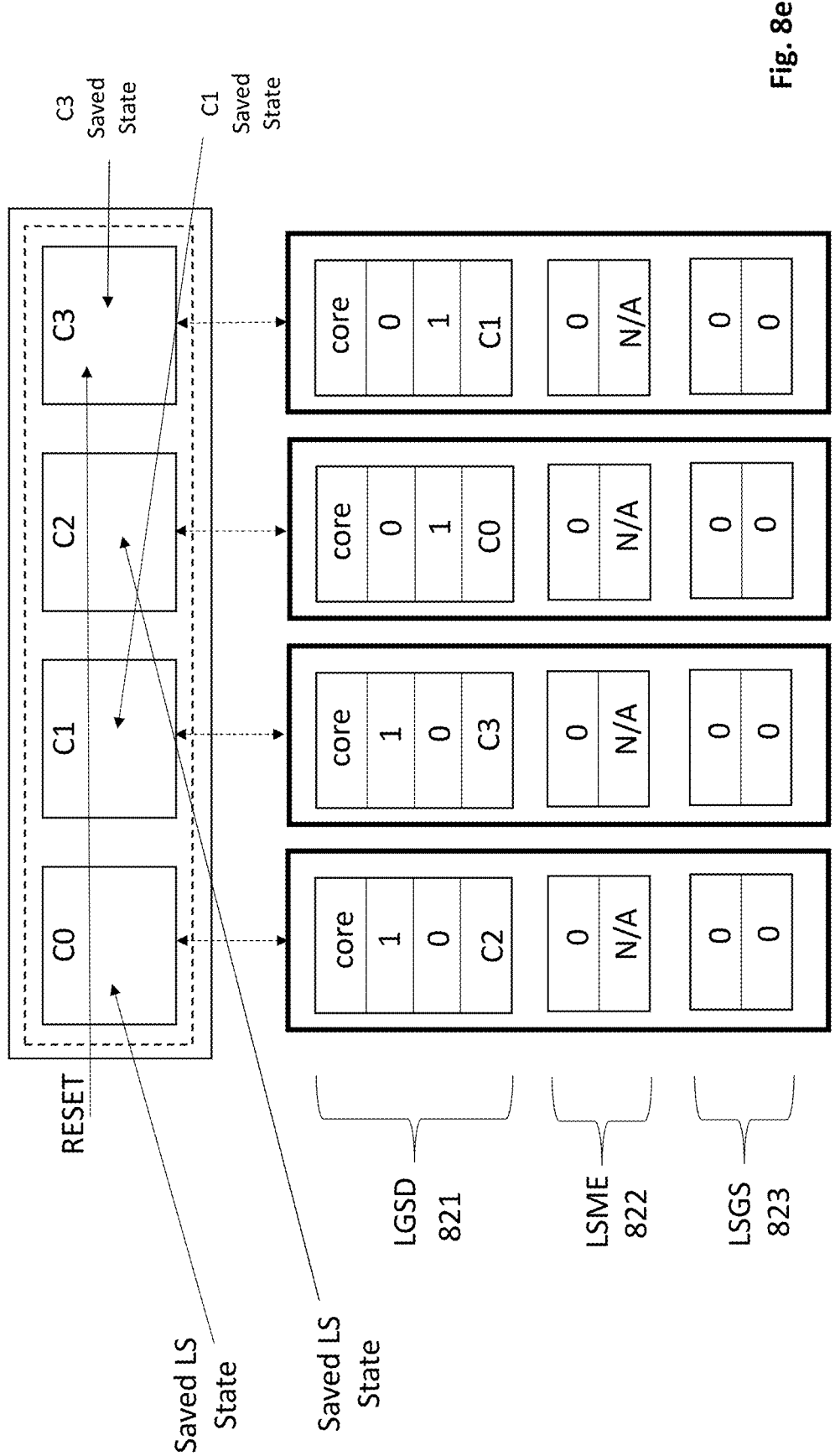

As observed in FIG. 8e, after the lock-step state of each processing entity has been externally saved, the processor hardware resets each of the processing entities and, coming out of the reset, restores the state of the active processing entities and the shadow processing entities. In the case of the active processing entities C0, C2, the state that was saved after completion of the corruption sensitive program code is loaded back into the active processing entities C0, C2. By contrast, in the case of the shadow processing entities C1, C3, the state that was externally saved in response to the shadow processing entity's initial request to enter lock-step mode (FIG. 7d) is loaded back into the shadow processing entities. Also, again, the reset is a soft/local reset and not a hard platform reset.

As observed in FIG. 8e, after the correct respective state has been restored in the processing entities, the active and shadow processing entities formally exit lock step mode which resets the information in the LSGS MSR 823. The active processing entities C0, C2 continue execution of their thread(s) at the instruction(s) that follow the corruption sensitive instruction sequence. By contrast, after the respective initial state has been restored in the shadow processing entities C1, C3, the shadow processing entities C1, C3 continue execution of their thread(s) from the instruction(s) from the saved check point where execution was stopped to enter lock-step mode (FIG. 7c).

As with lock-step mode entry, in alternate embodiments, the set of processing entities do not simultaneously exit lock-step mode, e.g., as a matter of definition or otherwise. For instance, according to one alternate embodiment, a processing entity is deemed to exit lock-step mode when its lock-step execution state has been saved.

Notably, unlike the traditional processor of FIG. 1 described in the Background that is not capable of stopping lock-step operation, by contrast, the improved processor of FIG. 3a is designed to interrupt lock-step activity at any time during lock-step mode if certain events occur, and, report the interrupt through register space. Here, referring briefly back to FIG. 3a, the LSBS MSR register space 314 is designed to report that a break has occurred during lock-step mode/activity and provide additional information concerning the cause of the break.

FIG. 6d shows a more detailed embodiment of the LSBS MSR. As observed in FIG. 6d, the LSBS MSR includes three different fields for three different types of breaks. A first type of break occurs if any of the shadow processing entities in a lock-step group receive an interrupt signal or experience a similar event (e.g., general interrupt, non maskable interrupt (NMI), system management interrupt (SMI), initialization (INIT), startup inter processor interrupt (SIPI), machine check, doorbells, etc.). Breaks of this type are reported in a first field 614 in the LSBS MSR. A second type of break is initiated by software and is reported in a second field 615. A third type of break occurs if a comparison made during lock-step indicates that two compared values are unequal and is reported in a third field 616. Again, any of these breaks will cause lock-step mode/activity to end.

In the case of the third type of (miscompare) break event, in various embodiments, the miscompare is characterized according to one of three different characterizations: 1) uncorrectable errors, no action required (UENOA); 2) uncorrectable errors, software recovery required (UESRE); and, 3) uncorrectable errors (UC).

In the case of UENOA, the mis-compare error(s) did not cause changes to pertinent (e.g., control) architectural state. As such, lock-step mode can be restarted. In the case of UESRE, there is an error with a memory load/store or cache snoop transaction and the affected address is reported. In this case, lock-step mode can be continued if software cures the content of the affected address. In the case of UC, the mis-compare error(s) caused changes to pertinent (e.g., control) architectural state and lock-step mode cannot be re-started. In an embodiment, more than one UESRE error results in the UC state because the address of only one of the memory transaction errors is reported. In an embodiment, if the data emitted by the active and shadow processing entities do not match, the processor, in addition to triggering the lockstep break, can also mark the data as poisoned such that the destination of the data (other cores, devices, etc.) can be alerted that this data is suspect and should not be consumed.

Although the discussion(s) above have emphasized detection of corruptions from a mis-compare of values during lock-step, in some scenarios, there can be corruption(s) within a processing entity that do not lead to a mismatching error outside the processing entities and therefore go undetected by the lock-step scheme. In this case, the internal state of processing entity peers can be different.

To detect internal mismatches between peers, in various embodiments, the processor, as part of the lock-step break process also: a) flushes all processing entity internal caches, internal state and architectural state to on-die SRAM or other storage outside of the core; and, b) places the processing entities into a sleep state from where the hardware can reset and reconfigure out of lock-step mode. The respectively stored state of the peers can then be compared by the comparator as part of the lockstep break action. Any mismatches can be logged as errors and any mismatching data poisoned.

Note that the teachings above can still be performed with processors having variations of the specific, exemplary processor described above (e.g., some processors may not perform a double comparison of intermediate values).

Although embodiments above have stressed entry into lock-step mode for purposes of verifying execution of corruption sensitive program code. It is pertinent to mention that lock-step mode can be dynamically entered/exited for reasons other than such verification. For example, an error scouting application that periodically executes itself in lock-step mode to detect if any permanent faults have developed. The error scouting application itself does not have anything it cares to protect against corruption but uses the lockstep mode as a way to screen the hardware for defects.

The various processor operations described above can be realized/implemented with logic circuitry of the processor (e.g., one or more dedicated hardwired logic circuitry (e.g., state machine logic circuit(s)), field programmable gate array (FPGA), etc.) designed to perform these operations along with any supporting state keeping elements (e.g., registers, embedded memory (SRAM, eDRAM), caches, external memory, etc.). As such, in particular, referring back to FIG. 3a, the improved processor also includes logic circuitry 320 to support dynamic entry/exit of a lock-step group's processing entities to/from lock-step mode including but not limited to: i) termination of lock-step execution by a lock step group's processing entities before lock-step executed is completed; ii) as part of the exit from lock-step mode, restoring a state of a shadow processing entity as the state existed before the shadow processing entity entered lock-step mode and began lock-step execution. Logic circuitry to perform any/all other processor operations described above can also be represented by logic circuitry 320 in FIG. 3a.

Note that any of the writes to MSR space described above can be implemented, in various embodiments, with a "write MSR" (WRMSR) instruction. Typically, execution of an WRMSR instruction entails the transfer of information from general purpose register space to MSR space. FIG. 3a depicts a high level view of an embodiment of an WRMSR instruction 330. As observed in FIG. 3a, the WRMSR instruction 330 includes an opcode field 331, a source field 332 and a destination field 333. Consistent with the above description, in various embodiments: 1) the opcode field 331, e.g., specifies a move of contents from source register space to a destination register space; 2) the source field 332 identifies content within general purpose register space (e.g., the entire content of a pair of general purpose registers EDX and EAX ("EDX:EAX")); and, 3) the destination field 333 identifies other content within general purpose register space (e.g., the entire content of ECX) that identifies a specific lock-step MSR register 311, 312, 313, 314 or equivalent space within one or more MSRs. Upon execution of the WRMSR instruction, the content identified by the source field 332 is written into the MSR space identified by the content in the destination field 333. In other WRMSR embodiments, the instruction format of the WRMSR instruction 330 does not include explicit source and destination fields (fields 332 and 333 are not technically present). Rather, the source and destination are defined as part of the opcode definition (e.g., the opcode specified in field 331 is defined to read the source information from EDX:EAX and write it to MSR space identified in ECX).

Figure 3B:
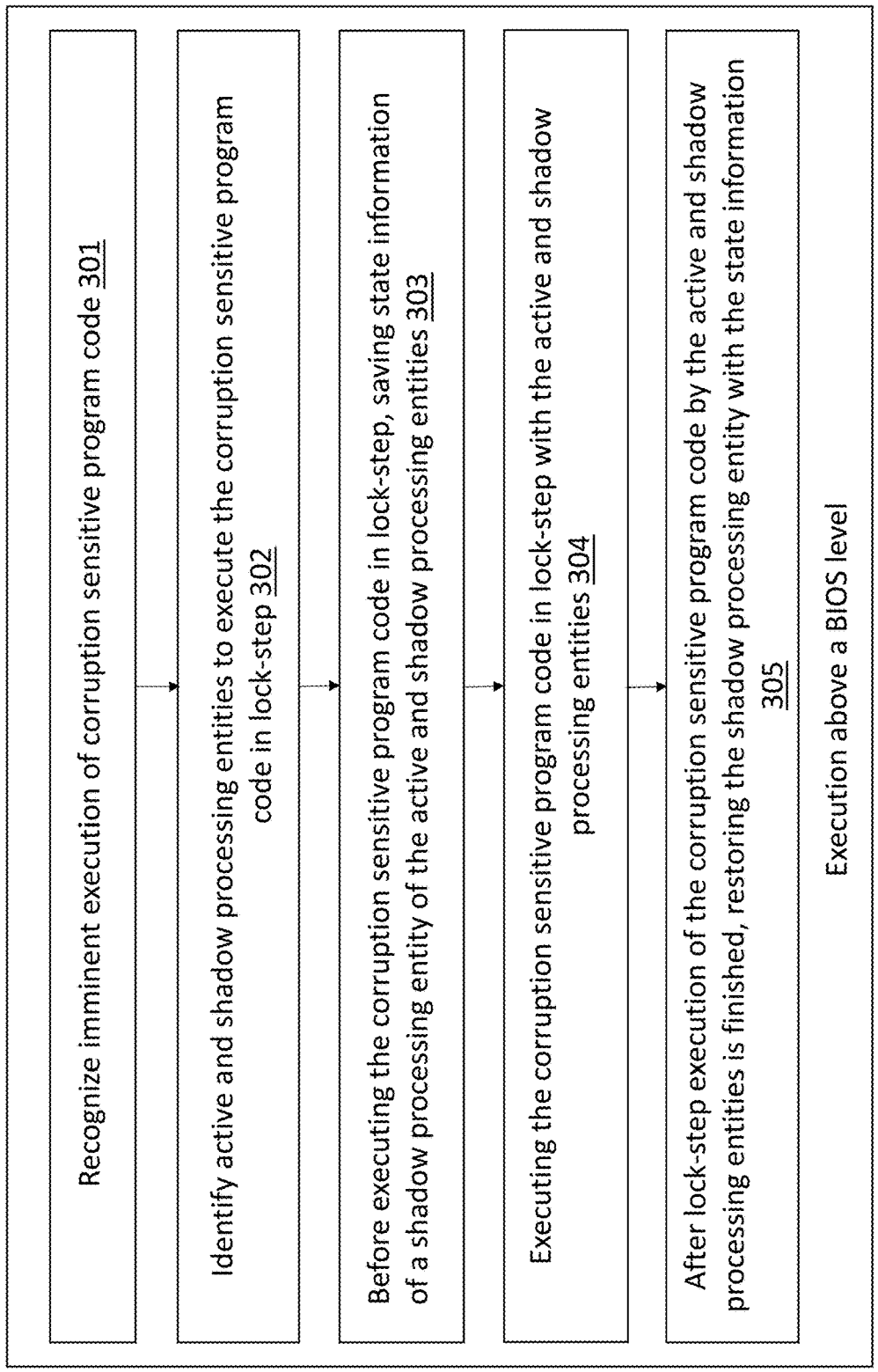

A method has been described above as depicted in FIG. 3b. As observed in FIG. 3b, the method is includes recognizing imminent execution of corruption sensitive program code 301. The method further includes identifying active and shadow processing entities to execute the corruption sensitive program code in lock-step 302. The method also includes, before executing the corruption sensitive program code in lock-step, saving state information of a shadow processing entity of the active and shadow processing entities 303. The method also includes executing the corruption sensitive program code in lock-step with the active and shadow processing entities 304. The method also includes after lock-step execution of the corruption sensitive program code by the active and shadow processing entities is finished, restoring the shadow processing entity with the state information 305. The method is executed above a BIOS level.

Processing Components for Executing Instructions

Figure 9:
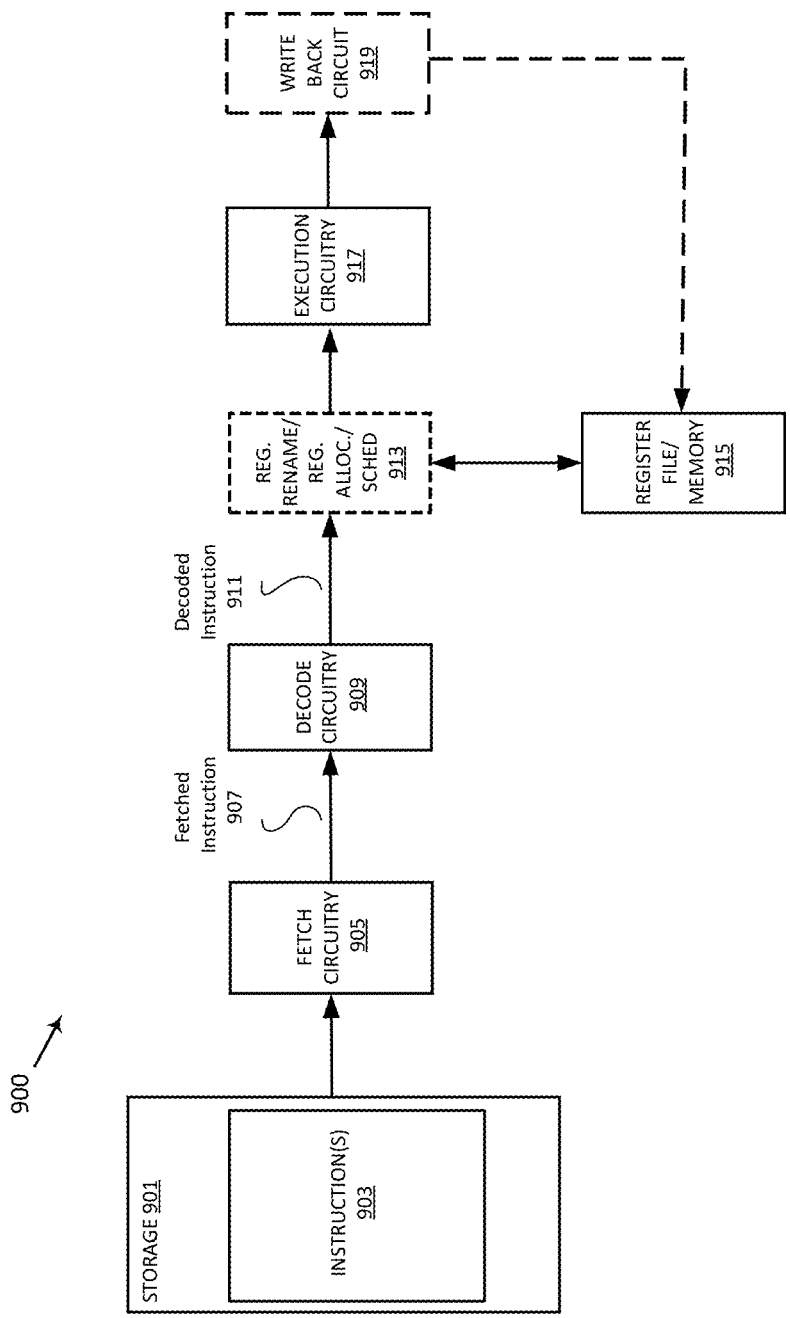
FIG. 9 is a block diagram illustrating processing components for executing instructions, according to some embodiments.

FIG. 9 is a block diagram illustrating processing components for executing instructions, according to some embodiments. As illustrated, storage 901 stores instruction(s) 903 to be executed, including, e.g., instructions that when executed perform any/all of the MSR register write operations, and/or other operations discussed at length above, to effect software visible and/or software controlled lock-step group configuration, execution and/or implementation. As described further below, in some embodiments, computing system 900 is a SIMD processor to concurrently process multiple elements of packed-data vectors, including matrices.

In operation, an instruction 903 is fetched from storage 901 by fetch circuitry 905. The fetched instruction 907 is decoded by decode circuitry 909. The instruction format, has fields (not shown here) to specify locations of first, second, and destination vectors. Decode circuit 909 decodes the fetched instruction 907 into one or more operations. In some embodiments, this decoding includes generating a plurality of micro-operations to be performed by execution circuitry (such as execution circuitry 917). The decode circuit 909 also decodes instruction suffixes and prefixes (if used).

In some embodiments, register renaming, register allocation, and/or scheduling circuit 913 provides functionality for one or more of: 1) renaming logical operand values to physical operand values (e.g., a register alias table in some embodiments), 2) allocating status bits and flags to the decoded instruction, and 3) scheduling the decoded instruction 911 for execution on execution circuitry 917 out of an instruction pool (e.g., using a reservation station in some embodiments).

Registers (register file) and/or memory 915 store data as operands of the decoded instruction 911 to be operated on by execution circuitry 917. Exemplary register types, other than MSR registers, include writemask registers, packed data registers, general purpose registers, and floating-point registers. In some embodiments, write back circuit 919 commits the result of the execution of the decoded instruction 911.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures, Processors, and Computer Architectures

FIG. 10A is a block diagram illustrating both an exemplary in-order pipeline and an exemplary register renaming, out-of-order issue/execution pipeline according to some embodiments of the invention. FIG. 10B is a block diagram illustrating both an exemplary embodiment of an in-order architecture core and an exemplary register renaming, out-of-order issue/execution architecture core to be included in a processor according to some embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/974 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to some embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1112-bits wide per direction.

FIG. 11B is an expanded view of part of the processor core in FIG. 11A according to some embodiments of the invention. FIG. 11B includes an L1 data cache 1106A part of the L1 cache 1106, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A and 1122B, and replication with replication unit 1124 on the memory input. Write mask registers 1126 allow predicating resulting vector writes.

Figure 12:
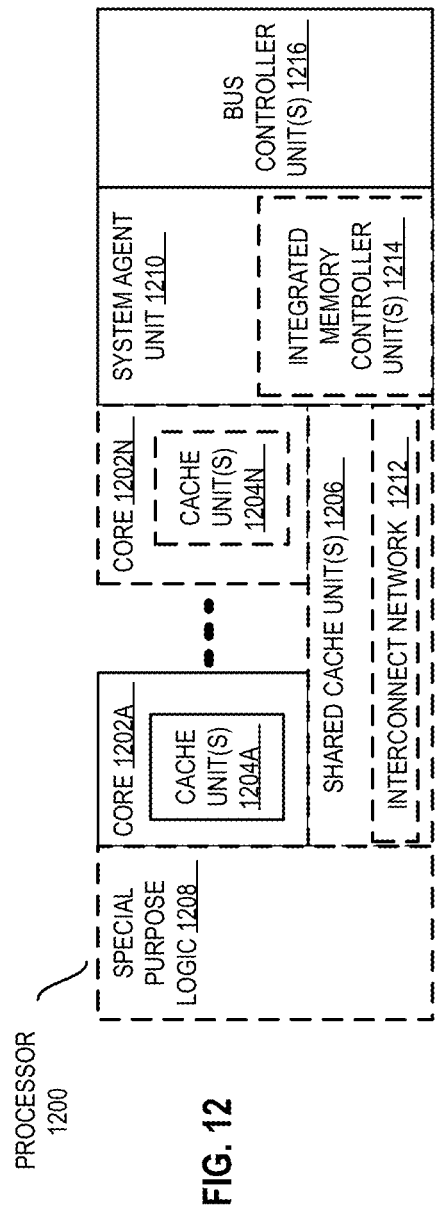
FIG. 12 is a block diagram of a processor that may have more than one core, may have an integrated memory controller, and may have integrated graphics according to some embodiments.

FIG. 12 is a block diagram of a processor 1200 that may have more than one core, may have an integrated memory controller, and may have integrated graphics according to some embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A through 1202N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, CMOS, manufacturing technologies that use a gate dielectric other than silicon dioxide, FinFET manufacturing technologies, etc.

The memory hierarchy includes one or more levels of cache within the cores, a set of one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208 (integrated graphics logic 1208 is an example of and is also referred to herein as special purpose logic), the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
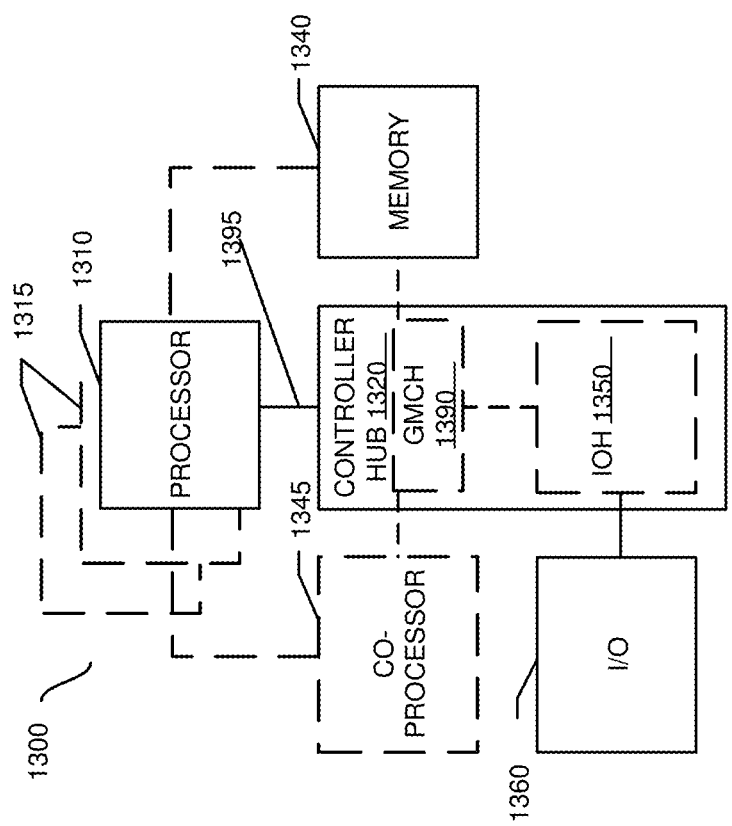
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), byte addressable non-volatile memory, or a combination of the two. For at least one embodiment, the controller hub 1320 communicates with the processor(s) 1310, 1315 via a multi-drop bus, such as a frontside bus (FSB), point-to-point interface such as Quick-Path Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
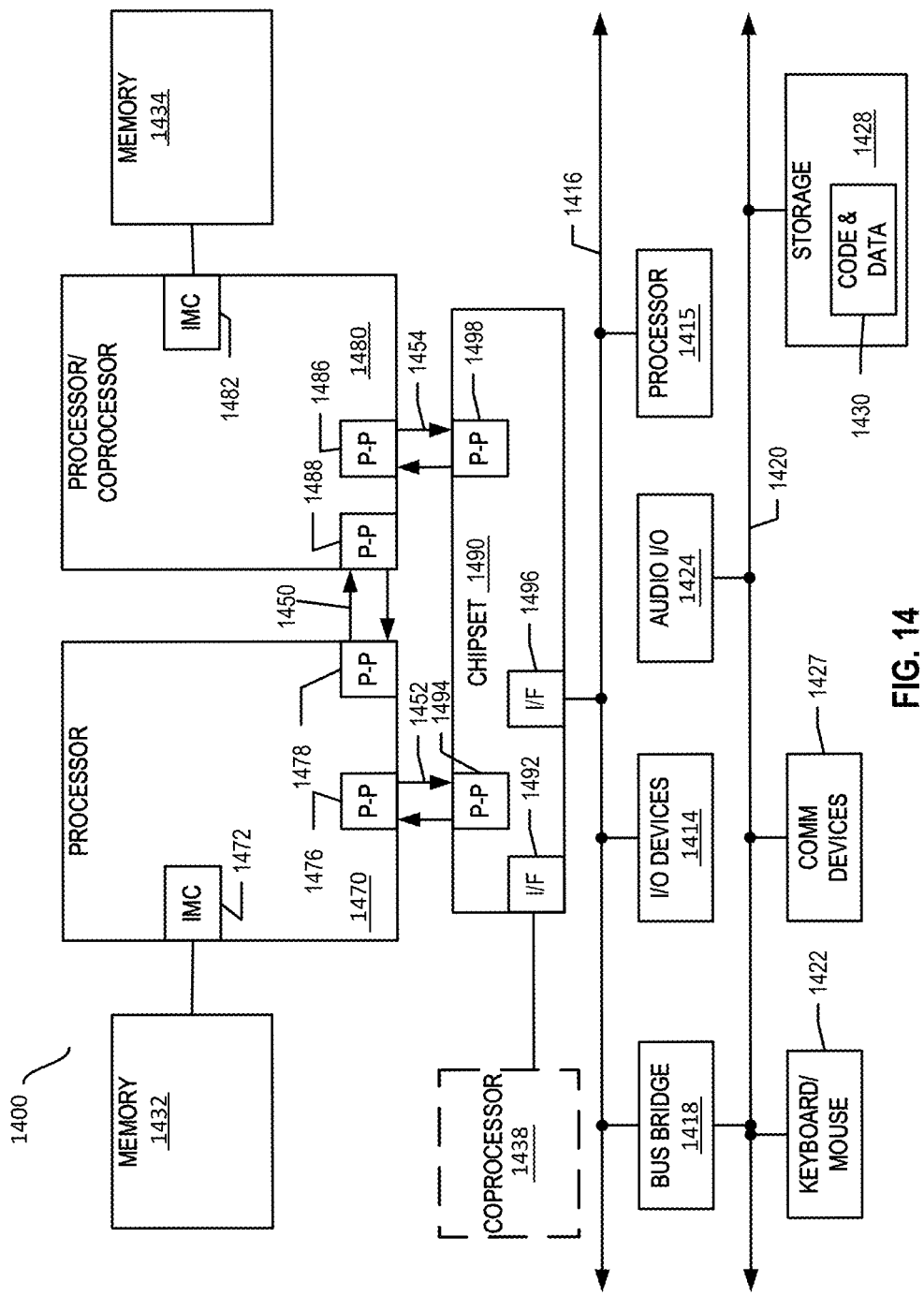

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In some embodiments, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interface circuits 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
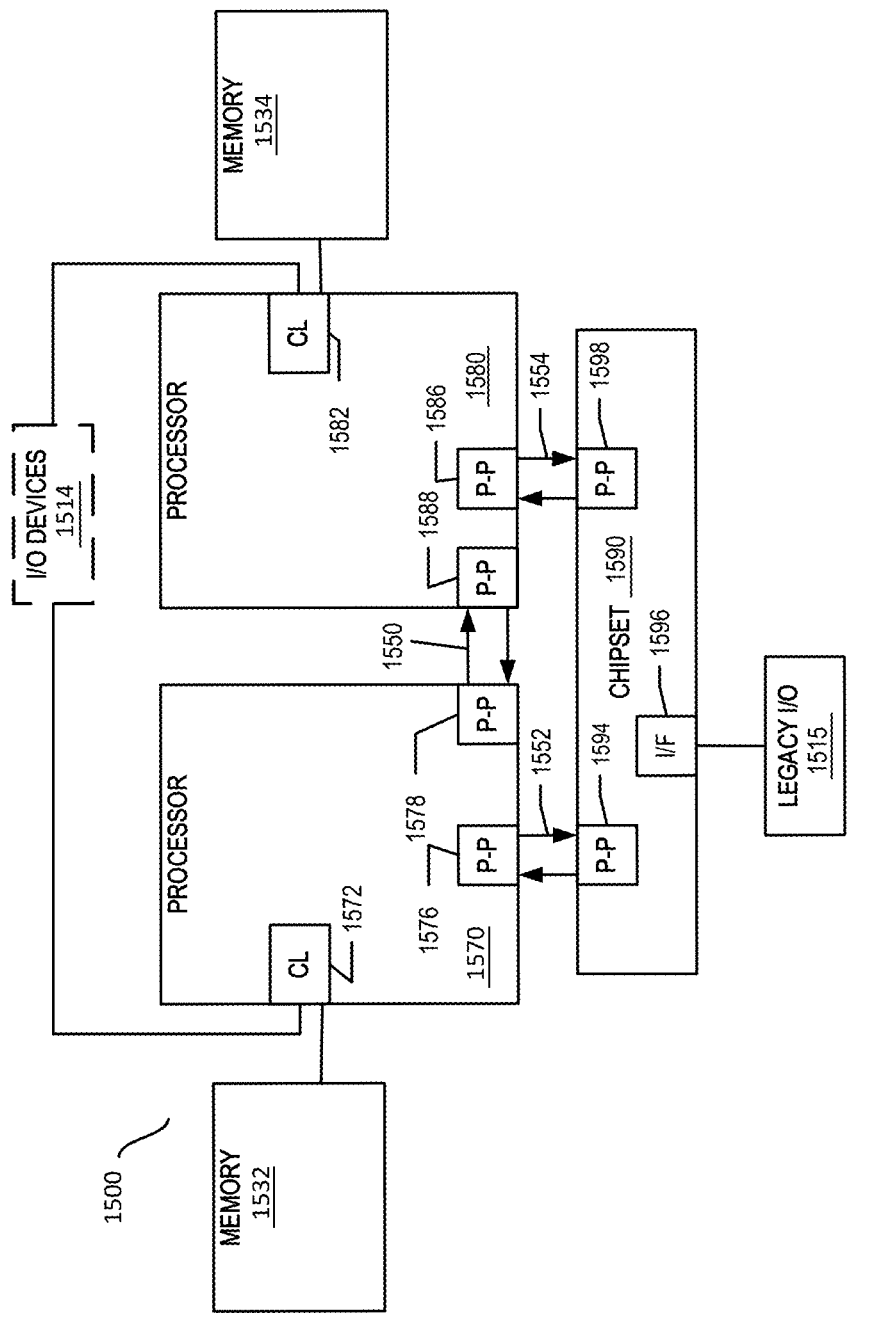

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
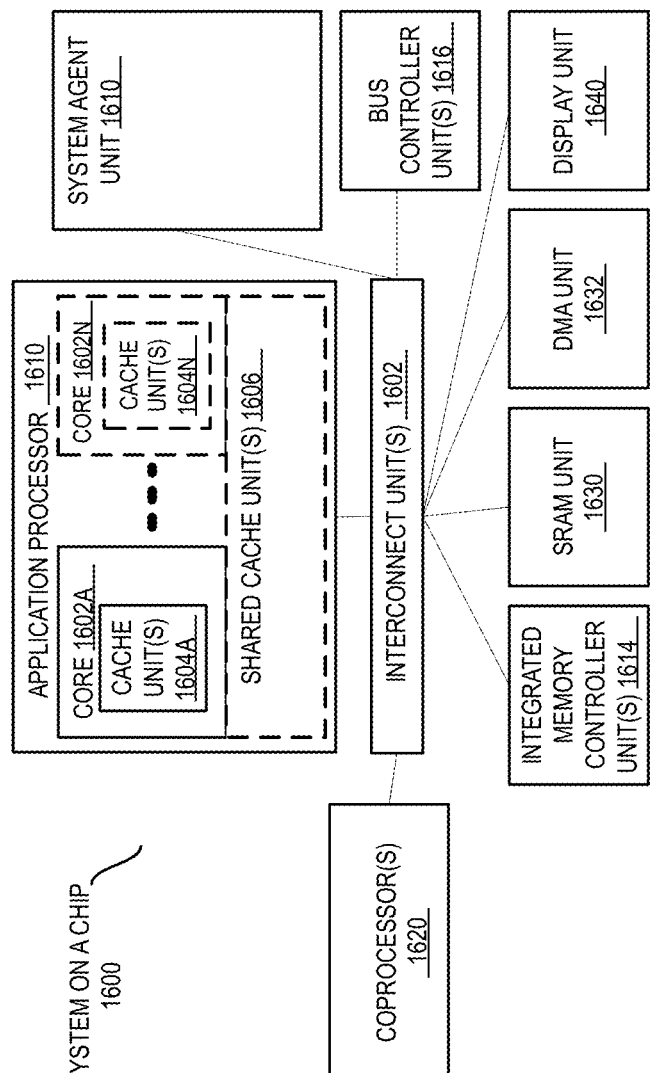

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1602A-N, which include cache units 1604A through 1604N, and shared cache unit(s) 1606; a system agent unit 1610; a bus controller unit(s) 1616; an integrated memory controller unit(s) 1614; a set of one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

EXAMPLES

An apparatus has been described. The apparatus includes first model specific register (MSR) space to specify a granularity of a processing entity of a lock-step group of processing entities. The apparatus includes second MSR space to specify whether the processing entity is an active or shadow processing entity of the lock-step group of processing entities. The apparatus includes third MSR space to indicate that the lock-step group of processing entities is active. The first MSR space, the second MSR space and the third MSR space is accessible to at least one of a virtual machine monitor, an operating system and an application software program.

In various embodiments, the granularity is any of: instruction execution pipeline granularity; module granularity; tile granularity; and die granularity. In various further embodiments the granularity also comprises core granularity.

In various embodiments the apparatus includes fourth MSR space to indicate when state information of a shadow processing entity of the lock step group of processing entities has been successfully saved.

In various embodiments, the first MSR space, the second MSR space and the third MSR space is assigned a class that permits the first MSR space, the second MSR space and the third MSR space to be accessed by at least one of a virtual machine monitor and an operating system. In various further embodiments the class permits the first MSR space, the second MSR space and the third MSR space to be accessed by BIOS.

In various embodiments the apparatus includes fourth MSR space to provide information that describes an event that caused a termination, prior to completion, of lock-step execution by the lock step group of processing entities. In various further embodiments the information is able to describe any of the following: a) mis-compare during the lock-step execution; b) an interrupt has been received by a shadow processing entity of the lock-step group of processing entities; c) a software initiated interrupt has occurred. In various further embodiments the apparatus includes fifth MSR space that, if a mis-compare during the lock-step execution caused the termination, provides even further information indicating any of: a) the lock-step execution can be restarted without software curing corrupted processing entity architectural state; b) the lock-step execution cannot be restarted without software curing corrupted processing entity architectural state; c) the lock-step execution cannot be restarted. In various further embodiments the apparatus is to mark data processed by the lock-step group of processing entities as being poisoned.

In various embodiments the apparatus further includes logic circuitry to, commensurate with an exit from a lock-step mode: a) save and compare internal cache and state information of lock-step peers; b) raise an error if the compare results in a mis-compare.

In various embodiments the apparatus further comprises logic circuitry to, as part of an exit from a lock-step mode, restore a state of a shadow processing entity of the lock-step group of processing entities as the state existed before the shadow processing entity entered a lock-step mode and began lock-step execution.

A computing system has been described. The computing system includes a processor having: (i) first model specific register (MSR) space to specify a granularity of a processing entity of a lock-step group of processing entities; (ii) second MSR space to specify whether the processing entity is an active or shadow processing entity of the lock-step group of processing entities; (iii) third MSR space to indicate that the lock-step group is active. The first MSR space, the second MSR space and the third MSR space is accessible to at least one of a virtual machine monitor, an operating system and an application software program. The computing system also includes a main memory coupled to the processor and a network interface.

The computing system can also include any of the various embodiments and further embodiments described just above.

In various embodiments, the processor of the computing system is to execute a write to MSR register instruction that writes to the second MSR space to specify whether the processing entity is an active or shadow processing entity of the lock-step group of processing entities.

A method has been described. The method includes executing software at a level above a BIOS level, the executing of the software includes: recognizing imminent execution of corruption sensitive program code; identifying active and shadow processing entities to execute the corruption sensitive program code in lock-step; before executing the corruption sensitive program code in lock-step, saving state information of a shadow processing entity of the active and shadow processing entities; executing the corruption sensitive program code in lock-step with the active and shadow processing entities; and, after lock-step execution of the corruption sensitive program code by the active and shadow processing entities is finished, restoring the shadow processing entity with the state information.

A processor has been described. The processor includes model specific register space that is visible to software above a BIOS level, the model specific register space to specify a granularity of a processing entity of a lock-step group. The processor includes logic circuitry to support dynamic entry/exit of the lock-step group's processing entities to/from lock-step mode including: i) termination of lock-step execution by the processing entities before the program code to be executed in lock-step is fully executed; and, ii) as part of the exit from the lock-step mode, restoration of a state of a shadow processing entity of the processing entities as the state existed before the shadow processing entity entered the lock-step mode and began lock-step execution of the program code.

What is claimed is:
1. An apparatus, comprising:
  first model specific register (MSR) space to specify a granularity of a processing entity of a lock-step group of processing entities;
  second MSR space to specify whether the processing entity is an active or shadow processing entity of the lock-step group of processing entities; and,
  third MSR space to indicate that the lock-step group of processing entities is active;
wherein, the first MSR space, the second MSR space and the third MSR space is accessible to at least one of a virtual machine monitor, an operating system and an application software program.

2. The apparatus of claim 1 wherein the granularity is any of:
  instruction execution pipeline granularity;
  module granularity;
  tile granularity;
  die granularity.

3. The apparatus of claim 2 wherein the granularity also comprises core granularity.

4. The apparatus of claim 1 further comprising fourth MSR space to indicate when state information of a shadow processing entity of the lock step group of processing entities has been successfully saved.

5. The apparatus of claim 1 wherein the first MSR space, the second MSR space and the third MSR space is assigned a class that permits the first MSR space, the second MSR space and the third MSR space to be accessed by at least one of a virtual machine monitor and an operating system.

6. The apparatus of claim 5 wherein the class permits the first MSR space, the second MSR space and the third MSR space to be accessed by BIOS.

7. The apparatus of claim 1 further comprising fourth MSR space to provide information that describes an event that caused a termination, prior to completion, of lock-step execution by the lock step group of processing entities.

8. The apparatus of claim 7 wherein the information is able to describe any of the following:
  a) mis-compare during the lock-step execution;
  b) an interrupt has been received by a shadow processing entity of the lock-step group of processing entities;
  c) a software initiated interrupt has occurred.

9. The apparatus of claim 8 further comprising fifth MSR space that, if a mis-compare during the lock-step execution caused the termination, provides even further information indicating any of:

a) the lock-step execution can be restarted without software curing corrupted processing entity architectural state;
b) the lock-step execution cannot be restarted without software curing corrupted processing entity architectural state;
c) the lock-step execution cannot be restarted.

10. The apparatus of claim 9 wherein the apparatus is to mark data processed by the lock-step group of processing entities as being poisoned.

11. The apparatus of claim 1 wherein the apparatus further comprises logic circuitry to, commensurate with an exit from a lock-step mode:
a) save and compare internal cache and state information of lock-step peers;
b) raise an error if the compare results in a mis-compare.

12. The apparatus of claim 1 wherein the apparatus further comprises logic circuitry to, as part of an exit from a lock-step mode, restore a state of a shadow processing entity of the lock-step group of processing entities as the state existed before the shadow processing entity entered a lock-step mode and began lock-step execution.

13. A computing system, comprising:
a) a processor, the processor comprising:
(i) first model specific register (MSR) space to specify a granularity of a processing entity of a lock-step group of processing entities;
(ii) second MSR space to specify whether the processing entity is an active or shadow processing entity of the lock-step group of processing entities; and,
(iii) third MSR space to indicate that the lock-step group is active;
wherein, the first MSR space, the second MSR space and the third MSR space is accessible to at least one of a virtual machine monitor, an operating system and an application software program;
b) a main memory coupled to the processor; and,
c) a network interface.

14. The computing system of claim 13 wherein the granularity is any of:
instruction execution pipeline granularity;
module granularity;
tile granularity;
die granularity.

15. The computing system of claim 13 wherein the processor is to execute a write to MSR register instruction that writes to the second MSR space to specify whether the processing entity is an active or shadow processing entity of the lock-step group of processing entities.

16. The computing system of claim 13 further comprising fourth MSR space to indicate when state information of a shadow processing entity of the lock step group of processing entities has been successfully saved.

17. The computing system of claim 13 wherein the first MSR space, the second MSR space and the third MSR space is assigned a class that permits the first MSR space, the second MSR space and the third MSR space to be accessed by at least one of a virtual machine monitor and an operating system.

18. The computing system of claim 17 wherein the class permits the first MSR space, the second MSR space and the third MSR space to be accessed by BIOS.

19. The computing system of claim 13 further comprising fourth MSR space to provide information that describes an event that caused a termination, prior to completion, of lock-step execution by the lock step group of processing entities.

20. The computing system of claim 19 wherein the information is able to describe any of the following:
a) mis-compare during the lock-step execution;
b) an interrupt has been received by a shadow processing entity of the lock-step group of processing entities;
c) a software initiated interrupt has occurred.

21. The computing system of claim 20 further comprising fifth MSR space that, if a mis-compare during the lock-step execution caused the termination, provides even further information indicating any of:
a) the lock-step execution can be restarted without software curing corrupted processing entity architectural state;
b) the lock-step execution cannot be restarted without software curing corrupted processing entity architectural state;
c) the lock-step execution cannot be restarted.

22. The computing system of claim 21 wherein the processor is to mark data processed by the lock-step of processing entities as being poisoned.

23. The computing system of claim 1 wherein the processor further comprises logic circuitry to, commensurate with an exit from a lock-step mode:
a) save and compare internal cache and state information of lock-step peers;
b) raise an error if the compare results in a mis-compare.

24. The computing system of claim 13 wherein the processor further comprises logic circuitry to, as part of an exit from a lock-step mode, restore a state of a shadow processing entity of the lock-step group of processing entities as the state existed before the shadow processing entity entered a lock-step mode and began lock-step execution.

* * * * *